(12) United States Patent
Takeda et al.

(10) Patent No.: US 7,532,681 B2
(45) Date of Patent: May 12, 2009

(54) WIRELESS COMMUNICATION APPARATUS

(75) Inventors: Daisuke Takeda, Kawasaki (JP);
Yoshimasa Egashira, Kawasaki (JP);
Tsuguhide Aoki, Kawasaki (JP);
Yasuhiko Tanabe, Kawasaki (JP);
Kohsuke Harada, Yokohama (JP);
Hironori Uchikawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 608 days.

(21) Appl. No.: 11/135,298

(22) Filed: May 24, 2005

(65) Prior Publication Data
US 2005/0265472 A1 Dec. 1, 2005

(30) Foreign Application Priority Data
May 28, 2004 (JP) ............................ 2004-160268

(51) Int. Cl.
*H04L 27/04* (2006.01)
(52) U.S. Cl. ........................ 375/299; 375/146; 375/267; 370/329; 370/437; 370/465; 455/45; 455/509; 455/101
(58) Field of Classification Search ................. 375/140, 375/141, 146, 267, 295, 299; 370/203, 204, 370/209, 330, 329, 431, 437, 464, 465, 468, 370/480; 455/45, 509, 515, 65, 101, 103
See application file for complete search history.

(56) References Cited

U.S. PATENT DOCUMENTS 7,388,920 B2 * 6/2008 Nam et al. .................. 375/260
2001/0028637 A1 * 10/2001 Abeta et al.
2004/0162021 A1 * 8/2004 Seki et al.
2004/0233838 A1 * 11/2004 Sudo et al.
2005/0141407 A1 * 6/2005 Sandhu
2005/0276349 A1 * 12/2005 Egashira et al.
2006/0034385 A1 * 2/2006 Egashira et al.
2006/0252386 A1 * 11/2006 Boer et al.

FOREIGN PATENT DOCUMENTS

JP 2004-336746 11/2004

OTHER PUBLICATIONS

Myeongchoel Shin, et al., "Correspondences", IEEE Transactions on Vehicular Technology, vol. 53, No. 1, Jan. 2004, pp. 261-265.
Tsuguhide Aoki, et al., "New preamble structure for AGC in a MIMO-OFDM system", IEEE 802.11-04/046rl, Jan. 2004, pp. 1-13.
Jan Boer, et al. "Backwards Compatibility", IEEE 802.11-03/714r0, Sep. 2003, 26 pgs.
U.S. Appl. No. 11/135,298, filed May 24, 2005, Takeda, et al.
U.S. Appl. No. 11/201,385, filed Aug. 11, 2005, Aoki.

* cited by examiner

*Primary Examiner*—Dac V Ha
(74) *Attorney, Agent, or Firm*—Oblon, Spivak, McClelland, Maier & Neustadt, P.C.

(57) ABSTRACT

Before data is transmitted from a plurality of antennas, a plurality of known symbol sequences are transmitted from these antennas. Each known symbol sequence contains a plurality of known symbols having different subcarrier arrangements. Known symbols transmitted from different antennas have different subcarrier arrangements.

7 Claims, 18 Drawing Sheets

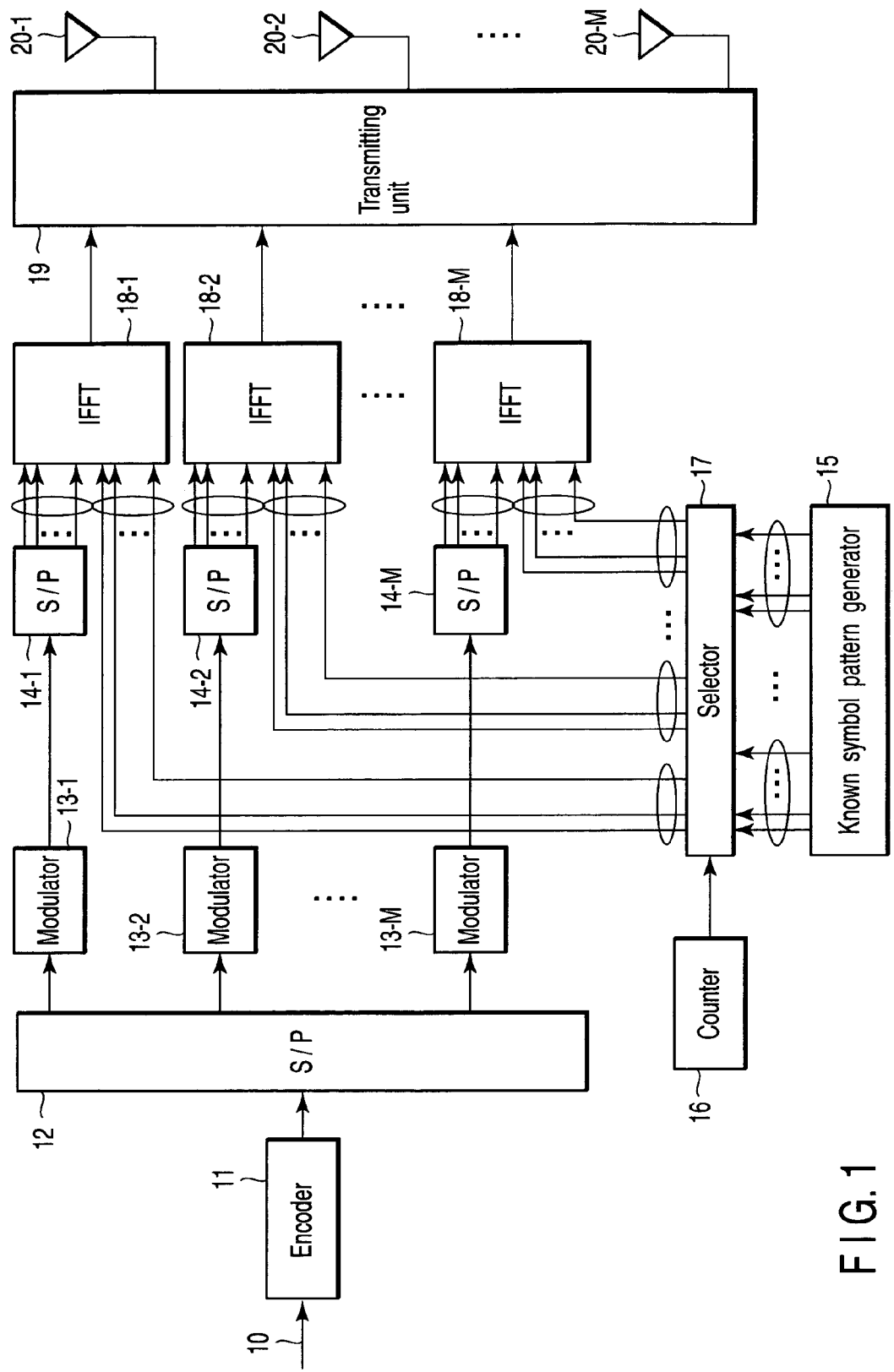
F I G. 1

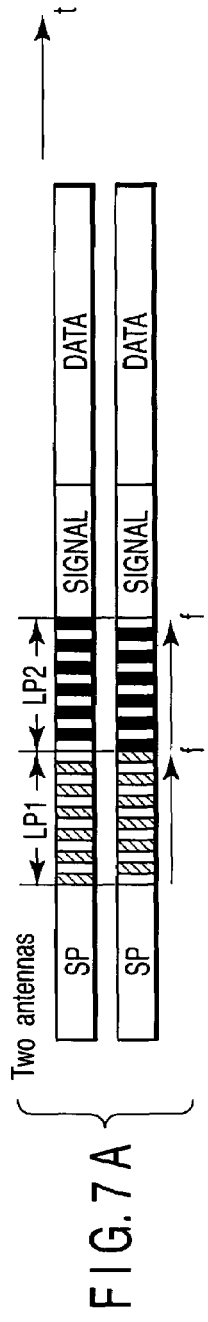 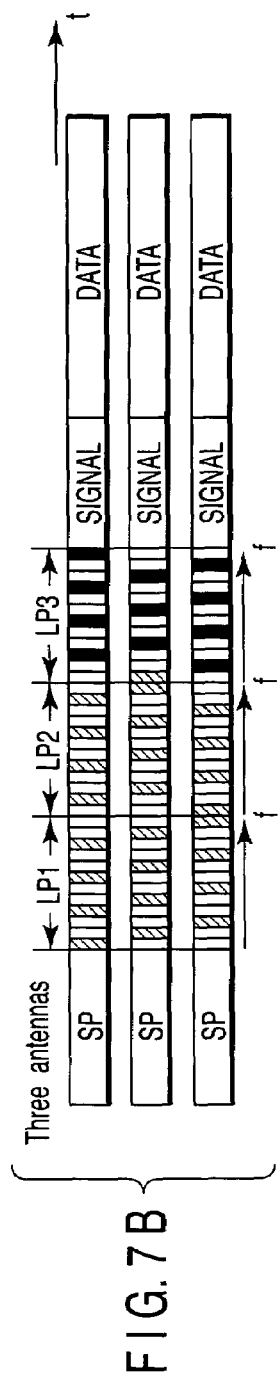 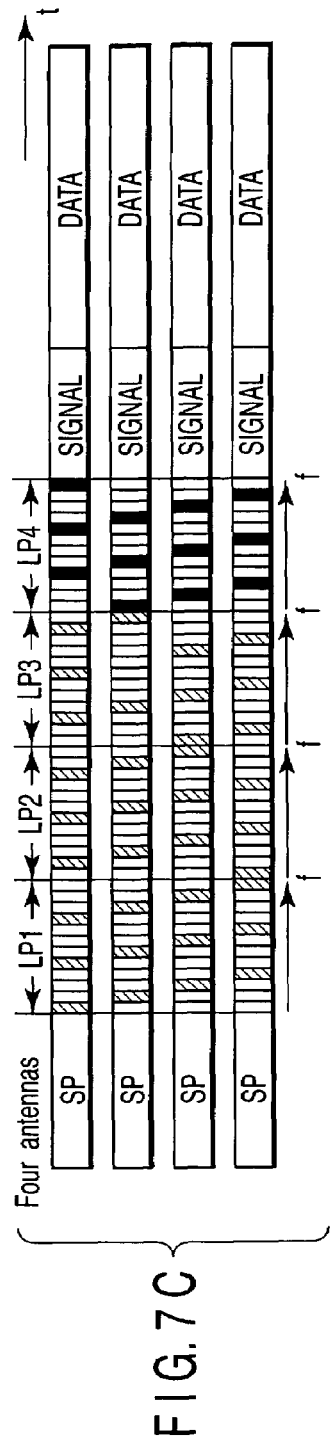
F I G. 7 A    F I G. 7 B    F I G. 7 C

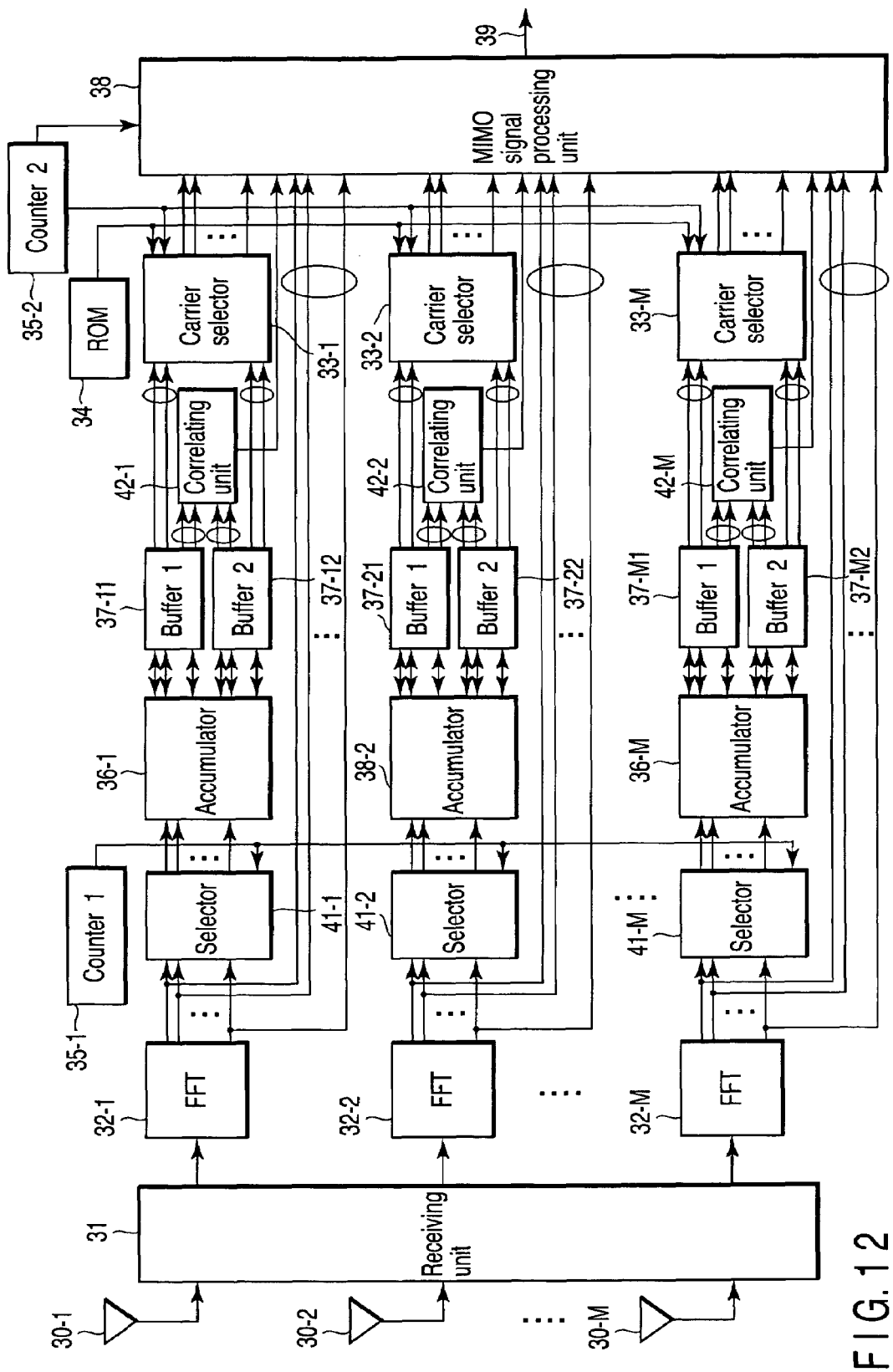
F I G. 12

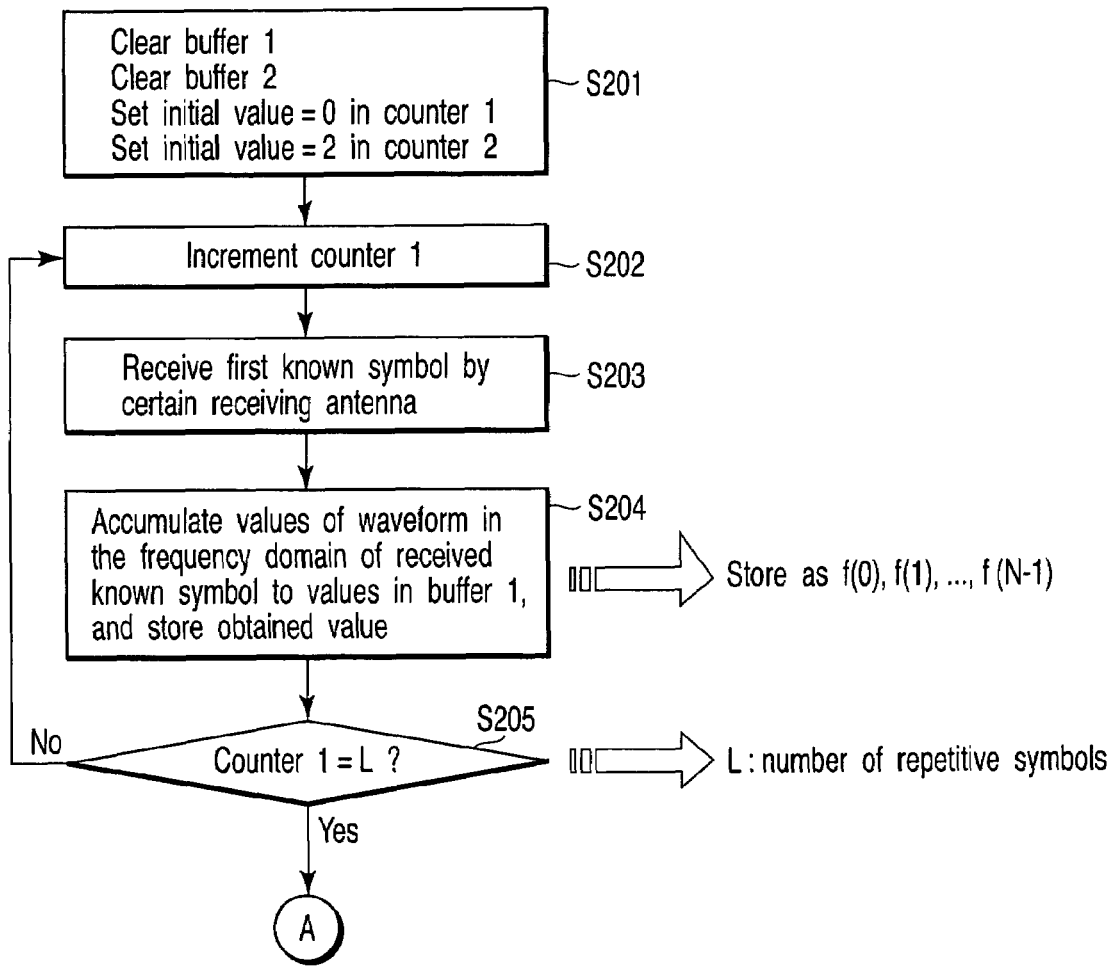
F I G. 1 3 A

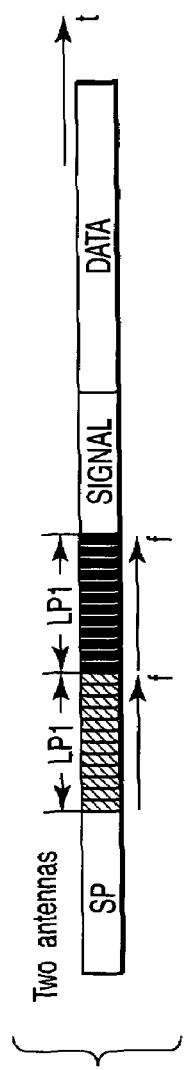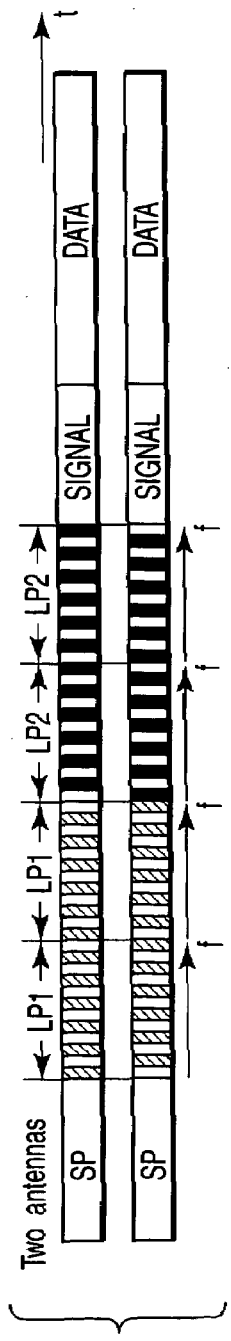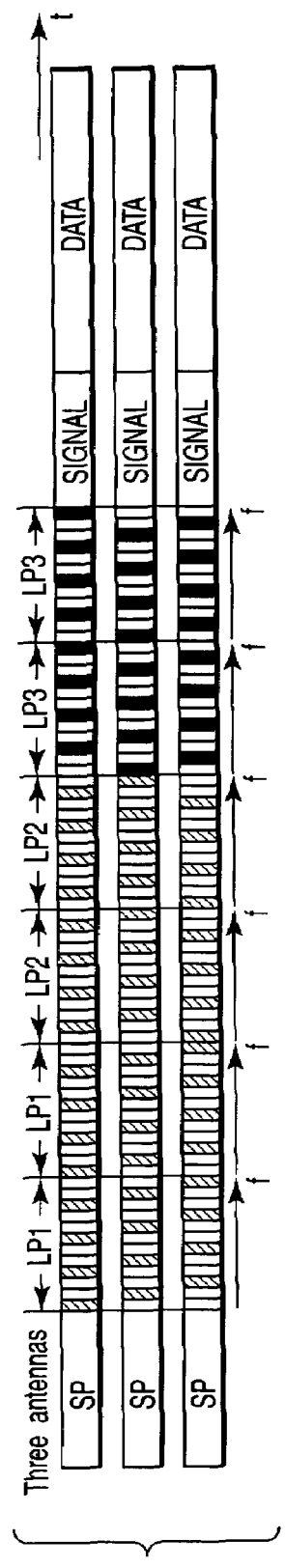
F I G. 14 A
F I G. 14 B
F I G. 14 C

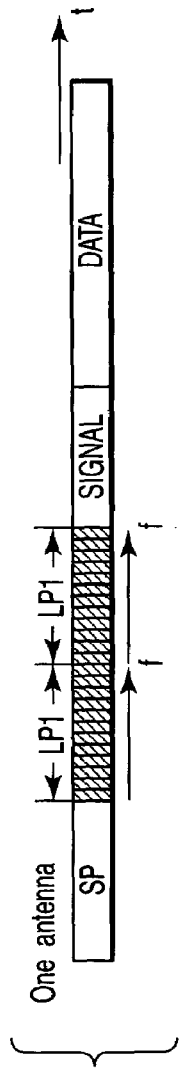
F I G. 16A
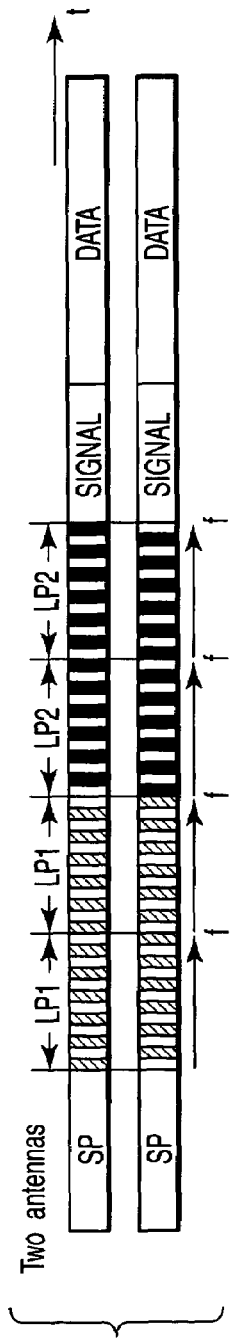
F I G. 16B
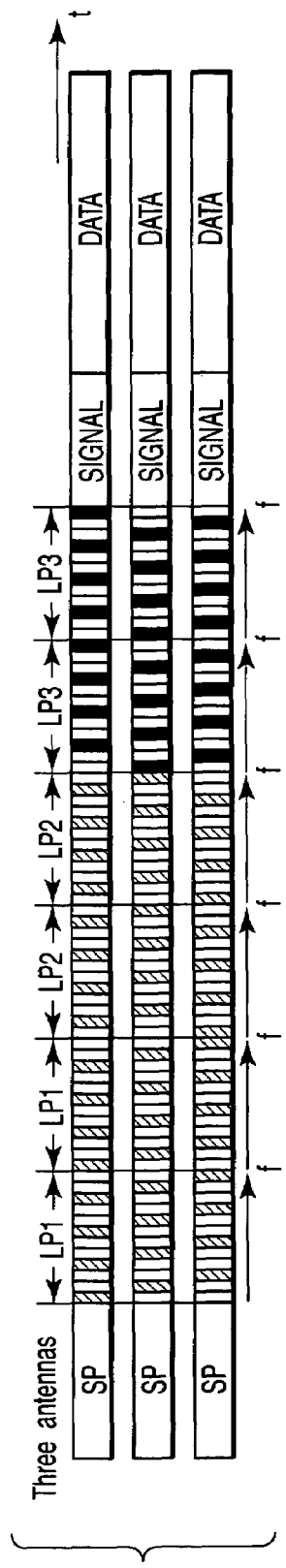
F I G. 16C

US 7,532,681 B2

WIRELESS COMMUNICATION APPARATUS

CROSS-REFERENCE TO RELATED APPLICATIONS

This application is based upon and claims the benefit of priority from prior Japanese Patent Application No. 2004-160268, filed May 28, 2004, the entire contents of which are incorporated herein by reference.

BACKGROUND OF THE INVENTION

1. Field of the Invention

The present invention relates to a so-called MIMO-OFDM wireless communication apparatus particularly useful in a high-speed wireless LAN which performs communication by using a plurality of antennas and a plurality of subcarriers.

2. Description of the Related Art

In the conventional wireless LAN standard, e.g., the IEEE 802.11a, synchronous processing and channel estimation are performed by transmitting known symbols (a short preamble and long preamble) before a data signal. By using these preambles, the subsequent signal portion and data portion can be demodulated.

Recently, a high-speed wireless LAN standard called IEEE 802.11n is being established. To achieve a transmission rate of 100 Mbps in a MAC layer, the IEEE 802.11n is based on multi-input multi-output (MIMO) using a plurality of antennas. In this MIMO technique, known symbols must be transmitted from a plurality of transmitting antennas by using preambles, in order to estimate the channel responses of propagation paths from these transmitting antennas to each receiving antenna.

In a preamble signal plan proposed by Jan Boer et al. in "Backwards Compatibility", IEEE 802.11-03/714r0, a short preamble sequence used for time synchronization, frequency synchronization, and AGC, a long preamble containing a symbol for channel estimation, and a signal field are first transmitted from one transmitting antenna, and then long preambles for channel estimation are transmitted in order from other transmitting antennas. After the transmission of the preamble signals is thus complete, data is simultaneously transmitted from a plurality of transmitting antennas. That is, long preambles for channel estimation are transmitted from a plurality of transmitting antennas by time-division multiplexing. In this preamble signal plan by Jan Boer et al., each long preamble is transmitted using a single antenna because long preambles containing known symbols for channel estimation are transmitted from a plurality of transmitting antennas by time-division multiplexing. On the other hand, data symbols following these preambles are simultaneously transmitted by using a plurality of antennas.

In a wireless communication apparatus, the transmitting power of a transmitter is desirably constant with time. However, when the numbers of antennas used in known symbol transmission and data symbol transmission are different as described above, the gain of a power amplifier during known symbol transmission must be set higher than that during data symbol transmission in order to hold the transmitting power constant. That is, the gains of the power amplifier must be frequently switched during transmission. This gain switching applies a load on the power amplifier and its control system, and lowers the throughput.

On the other hand, if the power of received signals largely fluctuates in a receiver because the number of antennas used in transmission changes, it becomes difficult to perform automatic gain control (AGC) by which the input signal level of an analog-to-digital converter (ADC) for converting a received signal into a digital signal is controlled within the dynamic range of this ADC.

BRIEF SUMMARY OF THE INVENTION

It is an object of the present invention to provide a wireless communication apparatus using a preamble structure capable of holding the transmitting power substantially constant without gain switching.

It is another object of the present invention to make accurate channel estimation by known symbols possible.

It is still another object of the present invention to allow the receiving side to readily estimate the number of antennas used in transmission without adding any extra information to a preamble, thereby making correct demodulation of data symbols feasible.

According to an aspect of the invention, there is provided a wireless communication apparatus comprises a plurality of antennas; a known symbol transmitting unit configured to transmit a plurality of known symbol sequences by using the plurality of antennas, each of the known symbol sequences containing a plurality of known symbols, and a plurality of known symbols transmitted from different antennas and having different subcarrier arrangements; and a data symbol transmitting unit configured to transmit a data symbol by using the plurality of antennas, after the known symbol sequences are transmitted.

According to another aspect of the invention, there is provided a wireless communication apparatus comprises a receiving unit configured to receive a plurality of known symbol sequences and a data symbol following the known symbol sequences, each of the known symbol sequences containing a plurality of known symbols, and a plurality of known symbols simultaneously transmitted from different antennas having different subcarrier arrangements; a channel estimating unit configured to obtain a channel estimation value from the received known symbol sequence; and a reproducing unit configured to reproduce the data symbol by using the channel estimation value.

BRIEF DESCRIPTION OF THE SEVERAL VIEWS OF THE DRAWING

FIG. 1 is a block diagram of a transmitter according to a first to third embodiments of the present invention;

FIGS. 7A, 7B, and 7C are views for explaining a known symbol transmission method according to the fourth embodiment;

FIG. 12 is a block diagram of a receiver according to the fifth embodiment;

FIGS. 13A and 13B are flowcharts showing a transmitting antenna count estimating algorithm in the receiver shown in FIG. 12;

FIGS. 14A, 14B, and 14C are views for explaining a known symbol transmission method according to a sixth embodiment of the present invention;

FIGS. 16A, 16B, and 16C are views for explaining a known symbol transmission method according to a seventh embodiment of the present invention.

DETAILED DESCRIPTION OF THE INVENTION

Figure 2A:
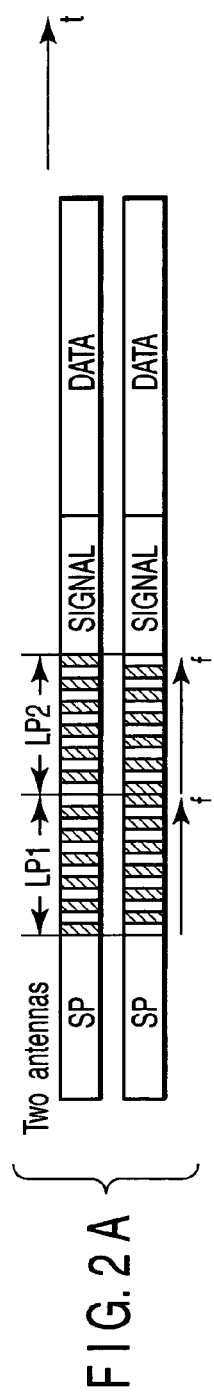
FIGS. 2A, 2B, and 2C are views for explaining a known symbol transmission method according to the first embodiment.

Several embodiments of the present invention will be described in detail below with reference to the accompanying drawing. A wireless communication system according to each embodiment is applicable to, e.g., a wireless LAN or mobile communication system (cellular system) which includes at least one base station apparatus and at least one terminal apparatus. A transmitter and receiver included in a wireless communication apparatus such as the base station apparatus or terminal apparatus will be explained below.

First Embodiment

First, a transmitter according to a first embodiment of the present invention will be described below with reference to FIG. 1. FIG. 1 shows physical layers of this transmitter. Data (a bit stream) 10 is transmitted in certain transmission units (e.g., frames or packets) from an upper layer. An encoder 11 performs, e.g., error correction coding on the input data 10, and generates a coded bit sequence. A serial-to-parallel (S/P) converter 12 divides the coded bit sequence into a plurality of streams by serial-to-parallel conversion. Modulators 13-1 to 13-M map these streams on a complex plane to generate modulated data symbols.

S/P converters 14-1 to 14-M perform serial-to-parallel conversion on the modulated data symbols so that they are transmitted on subcarriers of orthogonal frequency-division multiplexing (OFDM). In addition, inverse fast Fourier transform (IFFT) units 18-1 to 18-M transform these signals on the frequency domain into the time domain signals. The output time domain signals from the IFFT units 18-1 to 18-M are input to a transmitting unit 19.

In the transmitting unit 19, a guard interval (GI) is added to the output signals from the IFFT units 18-1 to 18-M, and the obtained signals are converted into analog signals by a digital-to-analog converter (DAC). The output signals from the DAC are converted (i.e., up-converted) into a radio-frequency (RF) band by a frequency converter, and supplied to transmitting antennas 20-1 to 20-M via a power amplifier. The OFDM signals are transmitted from the transmitting antennas 20-1 to 20-M to a wireless communication apparatus of a communication partner.

Preambles are transmitted before the data symbols are thus transmitted as the OFDM signals. A transmission system of preambles, particularly, known symbols for channel estimation will be explained below.

A known symbol pattern generator 15 is, e.g., a read-only memory (ROM), and stores a plurality of known symbol patterns. Each known symbol is transmitted by carrying its information on some of a plurality of OFDM subcarriers allocated beforehand. A known symbol pattern, which is a sequence of known symbol, indicates a subcarrier on which information of a known symbol is to be carried.

When a known symbol is to be transmitted, a plurality of known symbol patterns stored in the ROM of the known symbol pattern generator 15 are sequentially read at the transmission timing of the known symbol in accordance with a signal from a counter 16. The counter 16 counts the time, and outputs the count which momently changes.

When known symbol patterns in the frequency domain are stored in the ROM as in this example, readout known symbol patterns are input to the IFFT units 18-1 to 18-M via a selector 17, converted into waveforms in the time domain, and supplied to the transmitting unit 19. If known patterns of waveform in the time domain are stored in the ROM, readout known symbols are supplied to the transmitting unit 19 by bypassing the IFFT units 18-1 to 18-M.

A known symbol is transmitted a plurality of number of times from each antenna. The selector 17 distributes the known symbol patterns read from the ROM of the known symbol pattern generator 15, in accordance with the transmission order of the known symbol which is transmitted a plurality of number of times, such that the readout known symbol patterns are transmitted from appropriate transmitting antennas. That is, the selector 17 distributes the known symbol patterns to the transmitting antennas 20-1 to 20-M in accordance with the count value indicating time information from the counter 16. Note that if a plurality of types of known symbols such as a short preamble and long preamble included in preambles of a wireless LAN are present, the counter 16 and selector 17 selectively read these different types of known symbol patterns from the ROM.

TABLE 1

|  | Symbol 1 | Symbol 2 | Symbol 3 | ... | Symbol M − 1 | Symbol M |
|---|---|---|---|---|---|---|
| Antenna 1 | Pattern 1 | Pattern 2 | Pattern 3 | ... | Pattern M − 1 | Pattern M |
| Antenna 2 | Pattern 2 | Pattern 3 | Pattern 4 | ... | Pattern M | Pattern 1 |
| Antenna 3 | Pattern 3 | Pattern 4 | Pattern 5 | ... | Pattern 1 | Pattern 2 |
| . | . | . | . | . . | . | . |
| . | . | . | . | . . | . | . |
| Antenna M − 1 | Pattern M − 1 | Pattern M | Pattern 1 | ... | Pattern M − 3 | Pattern M − 2 |
| Antenna M | Pattern M | Pattern 1 | Pattern 2 | ... | Pattern M − 2 | Pattern M − 1 |

As indicated by a detailed operation example of the selector 17 shown in Table 1, the selector 17 shows patterns (known symbol patterns) of known symbols transmitted from the individual transmitting antennas. Note that for the sake of simplicity, the transmitting antennas 20-1 to 20-M shown in FIG. 1 are represented by antennas 1 to M in Table 1.

According to Table 1, M known symbols, i.e., symbol 1, symbol 2, . . . , symbol M−1, and symbol M are transmitted as follows. That is, from the antenna 1, pattern 1, pattern 2, . . . , pattern M−1, and pattern M are transmitted in this order. From the antenna 2, pattern 2, pattern 3, . . . , pattern M, and pattern 1 shifted in phase by one pattern from the known symbol transmitted from the antenna 1 are transmitted in this order as a known symbol. Likewise, from the antenna M, pattern M, pattern 1, . . . , pattern M−1 are transmitted in this order as a known symbol.

On the other hand, a receiver (to be described later) can obtain channel estimation values for all subcarriers when receiving the M known symbols simultaneously transmitted from the individual transmitting antennas.

Figure 2B:
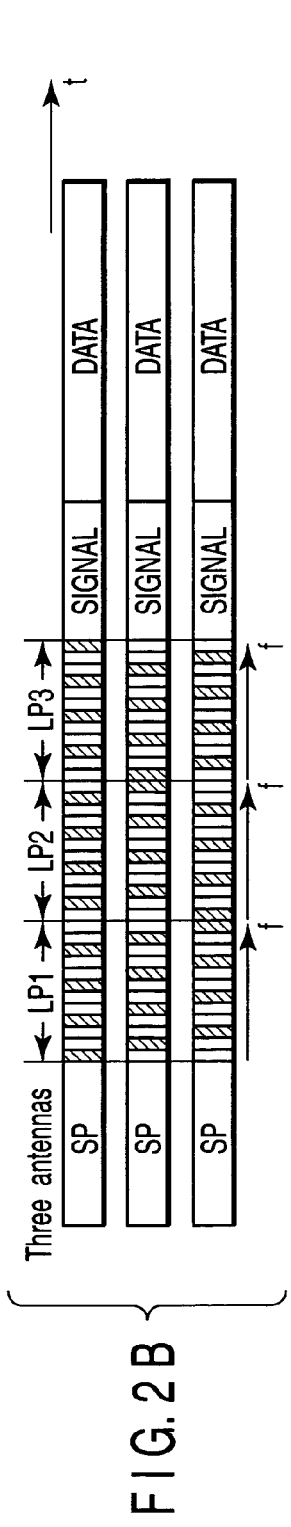
Figure 2C:
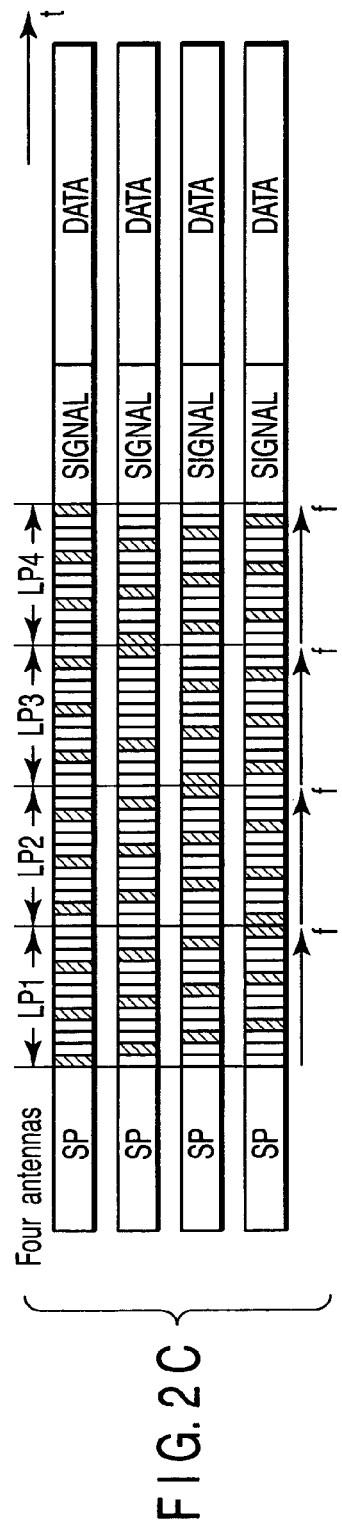

An example of a method of transmitting known symbols for channel estimation will be explained in detail below with reference to FIGS. 2A to 2C. FIGS. 2A, 2B, and 2C illustrate the structures of radio frames containing preambles when the numbers of transmitting antennas which simultaneously transmit known symbols are two, three, and four, respectively. The first embodiment assumes a system such as a wireless LAN which transmits a short preamble SP for synchronization and a long preamble LP for channel estimation before data DATA. The arrangement of the short preamble SP is not particularly limited. For example, a short preamble similar to the IEEE 802.11a can be transmitted from a plurality of transmitting antennas.

A known symbol is used for channel estimation in MIMO communication. In a wireless LAN, a known symbol corresponds to the long preamble LP shown in FIGS. 2A, 2B, and 2C. Referring to FIGS. 2A, 2B, and 2C, frequency-division multiplexing is performed on the long preamble LP transmitted from each transmitting antenna. Assuming that there are M transmitting antennas and N OFDM subcarriers, and N can be divided by M without a remainder, information of a known symbol exists in a subcarrier represented by expression (1) below (the numbers of the N subcarriers are defined as 0th to (N−1)th), and does not exit in any other subcarrier.

$$(Mk+m+i) \bmod N \quad (1)$$

where m=0, 2, . . . , M−1 are the antenna numbers, i=0, 1, 2, . . . , are the numbers of known symbols in the time domain, and k=0, 1, . . . , (N/M−1) means subcarrier index. For example, FIGS. 2A, 2B, and 2C are based on the assumption that the number of subcarriers is 12 (N=12). If the number of antennas shown in FIG. 2A is two (M=2), the positions of subcarriers where information of two known symbols transmitted from antennas 1 and 2 exists are as follows on the basis of expression (1) above.

Antenna 1: first known symbol: {0th, 2nd, 4th, 6th, 8th, and 10th} subcarriers; i.e, LP(2,1)={1,0,1,0,1,0,1,0,1,0,1,0}

Antenna 1: second known symbol: {1st, 3rd, 5th, 7th, 9th, and 11th} subcarriers; i.e, LP(2,2)={0,1,0,1,0,1,0,1,0,1,0,1}

Antenna 2: first known symbol: {1st, 3rd, 5th, 7th, 9th, and 11th} subcarriers; i.e, LP(2,2)={0,1,0,1,0,1,0,1,0,1,0,1}

Antenna 2: second known symbol: (0th, 2nd, 4th, 6th, 8th, and 10th) subcarriers; i.e, LP(2,1)={1,0,1,0,1,0,1,0,1,0,1,0}

In FIGS. 2A, 2B, and 2C, the structure of a preamble is represented with respect to time. For the sake of convenience, however, the long preamble LP is illustrated together with the way subcarriers used in individual antennas are made different from each other. Assuming that a known symbol has patterns LP(M,n) (M is the number of transmitting antennas, and n is the pattern number) in the case shown in FIG. 2A (the number M of antennas is two), known symbol patterns are transmitted from antennas 1 and 2 as follows.

Antenna 1: transmitted in the order of LP(2,1) and LP(2,2);
Antenna 2: transmitted in the order of LP(2,2) and LP(2,1);

In this case, the receiver (to be described below) can obtain channel estimation values for all the subcarriers from antenna 1 by extracting odd-numbered subcarriers of the first symbol and even-numbered subcarriers of the second symbol of known symbols transmitted from the antenna 1. Likewise, for known symbols transmitted from antenna 2, channel estimation values for all the subcarriers from antenna 2 can be obtained by extracting even-numbered subcarriers of the first symbol and odd-numbered subcarriers of the second symbol. Also, even if the known symbol patterns are transmitted in the reverse orders as follows, Antenna 1: transmitted in the order of LP(2,2) and LP(2,1);
Antenna 2: transmitted in the order of LP(2,1) and LP(2,2);

the same results as above can be obtained by changing the orders of subcarriers extracted by the receiver.

In the case shown in FIG. 2B (the number M of antennas is three), M=3, so the positions of subcarriers where information of three known symbols transmitted from antennas 1, 2, and 3 exists are as follows on the basis of expression (1).

Antenna 1: first known symbol: {0th, 3rd, 6th, and 9th} subcarriers; i.e., LP(3,1)={1,0,0,1,0,0,1,0,0,1,0,0}

Antenna 1: second known symbol: {1st, 4th, 7th, and 10th} subcarriers; i.e., LP(3,2)={0,1,0,0,1,0,0,1,0,0,1,0}

Antenna 1: third known symbol: {2nd, 5th, 8th, and 11th} subcarriers; i.e., LP(3,3)={0,0,1,0,0,1,0,0,1,0,0,1}

Antenna 2: first known symbol: {1st, 4th, 7th, and 10th} subcarriers; i.e., LP(3,2)={0,1,0,0,1,0,0,1,0,0,1,0}

Antenna 2: second known symbol: {2nd, 5th, 8th, and 11th} subcarriers; i.e., LP(3,3)={0,0,1,0,0,1,0,0,1,0,0,1}

Antenna 2: third known symbol: {0th, 3rd, 6th, and 9th} subcarriers; i.e., LP(3,1)={1,0,0,1,0,0,1,0,0,1,0,0}

Antenna 3: first known symbol: {2nd, 5th, 8th, and 11th} subcarriers; i.e., LP(3,3)={0,0,1,0,0,1,0,0,1,0,0,1}

Antenna 3: second known symbol: (0th, 3rd, 6th, and 9th) subcarriers; i.e., LP(3,1)={1,0,0,1,0,0,1,0,0,1,0,0}

Antenna 3: third known symbol: {1st, 4th, 7th, and 10th} subcarriers; i.e., LP(3,2)={0,1,0,0,1,0,0,1,0,0,1,0}

In this case, known symbol patterns are transmitted from antennas 1, 2, and 3 as follows.

Antenna 1: transmitted in the order of LP(3,1), LP(3,2), and LP(3,3);
Antenna 2: transmitted in the order of LP(3,2), LP(3,3), and LP(3,1);
Antenna 3: transmitted in the order of LP(3,3), LP(3,1), and LP(3,2);

In the case shown in FIG. 2C (four antennas), the positions of subcarriers where information of four known symbols transmitted from the individual antennas exists and the orders of known symbol patterns transmitted from these antennas are obvious from the above analogy. In the subcarrier arrangement shown in FIGS. 2A, 2B, and 2C as described above, the positions of subcarriers on which pieces of information of known symbols are carried form a nested structure.

When the known symbols are transmitted as described above, the receiver can obtain, in the same manner as when the number of antennas is 2, channel estimation values for all the subcarriers by extracting different subcarriers transmitted at different timings from different antennas. Also, as when there are two antennas, the same results as above can be obtained by changing the order of subcarriers to be extracted, even if the transmission orders of the known symbols are switched, provided that the combination of antenna directions remains the same.

Figure 3:
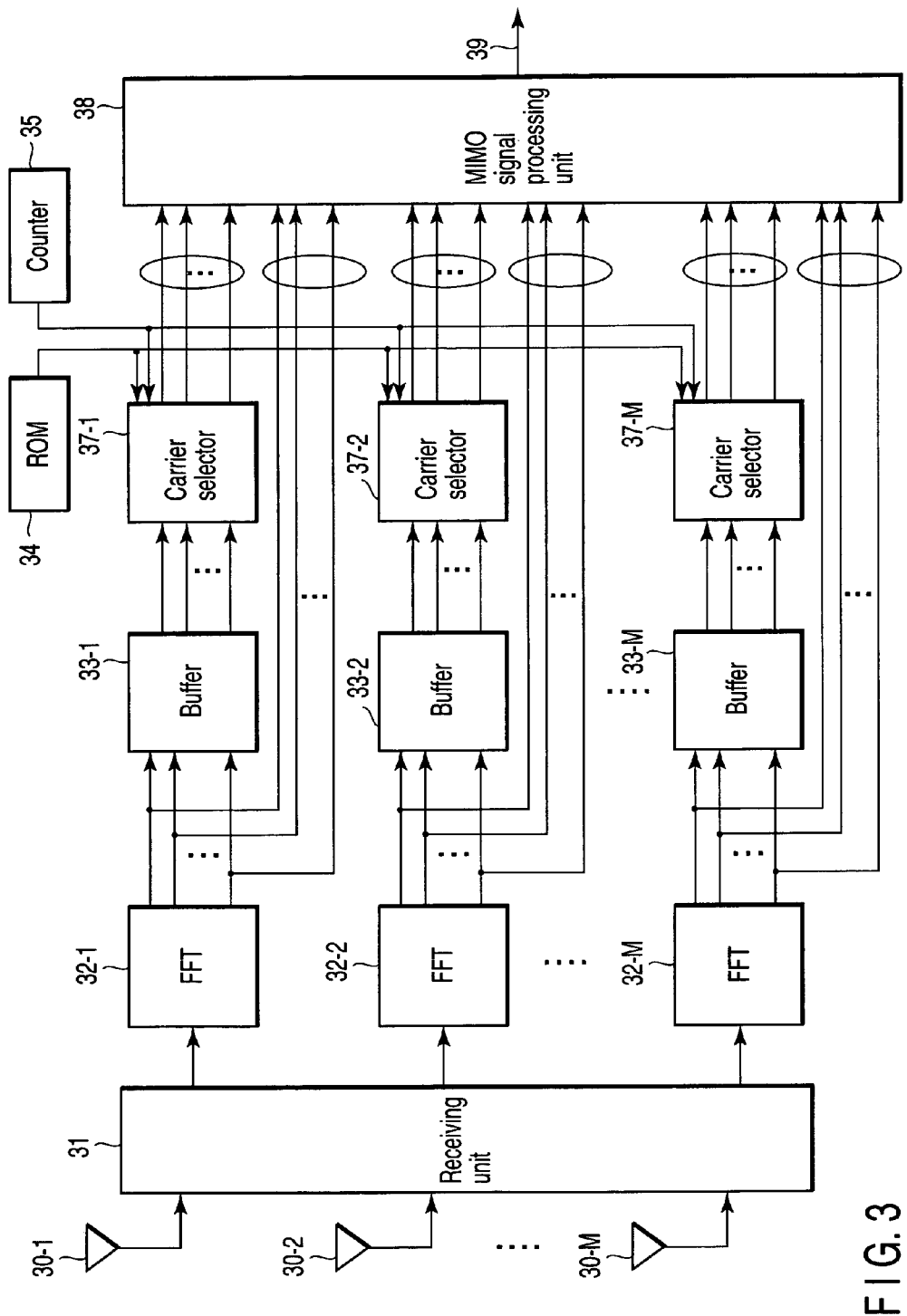
FIG. 3 is a block diagram of a receiver according to the first embodiment.

The receiver according to the first embodiment of the present invention will be described below with reference to FIG. 3. Referring to FIG. 3, the OFDM signals of the RF band transmitted from the transmitter shown in FIG. 1 are received by a plurality of receiving antennas 30-1 to 30-M. OFDM received signals from the receiving antennas 30-1 to 30-M are input to a receiving unit 31.

In the receiving unit 31, the input OFDM signals from the receiving antennas 30-1 to 30-M are amplified by a low-noise amplifier (LNA), and converted (i.e., down-converted) into a base band by a frequency converter. In addition, these frequency-converted signals are converted into digital signals by an ADC, and the guard interval (GI) is removed from the digital signals.

The output signals from the receiving unit 31 are input to fast Fourier transform (FFT) units 32-1 to 32-M where these time domain signals are transformed into frequency domain signals, i.e., into the waveforms of individual subcarriers. Of the output signals from the FFT units 32-1 to 32-M, signals of data symbol sections are input to a MIMO signal processing unit 38.

On the other hand, of the output signals from the FFT units 32-1 to 32-M, signals of preambles, particularly, known symbol sections are stored in buffers 37-1 to 37-M. When the waveforms of the individual subcarriers stored in these buffers are input to carrier selectors 33-1 to 33-M, the transmitting antennas and subcarriers are related to each other in accordance with known symbol patterns stored in a ROM 34. In this manner, channel estimation values between the transmitting antennas and receiving antennas are obtained. The obtained channel estimation values are used in demodulation by the MIMO signal processing unit 38.

The MIMO signal processing unit 38 performs a MIMO signal receiving process, e.g., maximum likelihood estimation, on the data symbol section signals from the FFT units 32-1 to 32-M in accordance with the channel estimation values from the carrier selectors 33-1 to 33-M. Channel decoding is performed on the signals having undergone this MIMO signal receiving process, thereby reproducing transmitted data 39.

In the first embodiment as described above, known symbols are simultaneously transmitted from all the antennas of the transmitter. Therefore, the transmitting power can be held constant without frequently switching the gains of the power amplifier. This means that the power fluctuation between short preamble and long preamble does not occur and This allows easy AGC in the receiver by using short preamble.

Also, since known symbols are simultaneously transmitted as different waveforms from the antennas, beam forming effect when identical waveforms are transmitted from a plurality of antennas does not occur. Accordingly, receivers present in various directions when viewed from the transmitter can correctly receive the known symbols.

In addition, subcarrier arrangements (allocations) of the antennas of the transmitter are different. Therefore, waveforms transmitted from these antennas are orthogonal to each other, so accurate channel estimation can be performed for each antenna.

Furthermore, the number of antennas imposes no limitation (e.g., the efficiency worsens in code multiplexing unless the second power is used), so the number of symbols can be adjusted linearly with respect to the number of antennas.

As described above, it is possible to perform channel estimation for all subcarriers by preventing the lowering of the efficiency caused by the number of antennas, while the load on the amplifier is reduced.

In the embodiment, known symbols are simultaneously transmitted from all the antennas. Therefore, the transmitting power can be held constant without frequently switching the gains of the power amplifier. Also, known symbols are simultaneously transmitted as different waveforms from different antennas. This prevents the formation of a NULL (a zero point of directivity) which is produced when identical waveforms are transmitted from a plurality of antennas. Accordingly, the receiver can correctly receive known symbols. Furthermore, since the antennas of the transmitter have different subcarrier arrangements (allocations), these antennas are orthogonal to each other. This allows accurate channel estimation for each antenna.

Second Embodiment

In the first embodiment, the number N of subcarriers is divisible by the number M of antennas. In a second embodiment, an example of a case in which N is indivisible by M, such as a long preamble of a wireless LAN, will be explained. Of 64 IFFT samples in a wireless LAN, usable subcarriers are 52 subcarriers, and other subcarriers are not carried on signals. In this case, if the number M of antennas is three, N is indivisible by M, so the number of subcarriers allocated to each antenna changes from one antenna to another.

For example, in a long preamble $L_{-26,26}$ Of the IEEE 802.11a, signals having patterns as shown in Table 2 below are present in the −26th to 26th subcarriers, and transmitted by BPSK modulation.

TABLE 2

IEEE 802.11a long preamble structure ($L_{-26, 26}$)

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| Sequence | 1 | 1 | −1 | −1 | 1 | 1 | −1 | 1 | −1 | 1 | 1 | 1 | 1 |
| Carrier number | −13 | −12 | −11 | −10 | −9 | −8 | −7 | −6 | −5 | −4 | −3 | −2 | −1 |
| Sequence | 1 | 1 | −1 | −1 | 1 | 1 | −1 | 1 | −1 | 1 | 1 | 1 | 1 |
| Carrier number | +1 | +2 | +3 | +4 | +5 | +6 | +7 | +8 | +9 | +10 | +11 | +12 | +13 |
| Sequence | 1 | −1 | −1 | 1 | 1 | −1 | 1 | −1 | 1 | −1 | −1 | −1 | −1 |
| Carrier number | +14 | +15 | +16 | +17 | +18 | +19 | +20 | +21 | +22 | +23 | +24 | +25 | +26 |
| Sequence | −1 | 1 | 1 | −1 | −1 | 1 | −1 | 1 | −1 | 1 | 1 | 1 | 1 |

(Sequence is 0 for carrier number 0.)

In contrast, in the embodiment of the present invention, known symbols (long preambles) transmitted from individual antennas have undergone frequency multiplexing. Assuming that the pattern of a known symbol according to the second embodiment is $L_{-26,26}(M,n)$ (M is the number of transmitting antennas, and n is the pattern number), the transmission sequence $L_{-26,26}$ multiplied by patterns $LP(M,n)$ of known symbols are represented as shown in Table 3 or 4 if the number of antennas is two. The existing long preamble is used as a base, and, for the −26th to −1st subcarriers, subcarriers are allocated to every other position from the −26th position. Similarly, subcarriers are allocated to every other position for the 1st to 26th subcarriers. When there are two transmitting antennas, long preambles are transmitted as follows by using the patterns shown in Table 3 or 4.

Antenna 1: transmitted in the order of $L_{-26,26}(2,1)$ and $L_{-26,26}(2,2)$;

Antenna 2: transmitted in the order of $L_{-26,26}(2,2)$ and $L_{-26,26}(2,1)$;

Antenna 1: transmitted in the order of $L_{-26,26}(2,2)$ and $L_{-26,26}(2,1)$;

Antenna 2: transmitted in the order of $L_{-26,26}(2,1)$ and $L_{-26,26}(2,2)$;

On the other hand, when there are three antennas, patterns as shown in Tables 5 to 7 below are used for 52 subcarriers. For the −26th to −1st subcarriers, subcarriers are allocated to every third position from the −26th position. Similarly, subcarriers are allocated to every third position for the 1st to 26th subcarriers. Transmission patterns when there are three transmitting antennas are as follows.

Antenna 1: transmitted in the order of $L_{-26,26}(3,1)$, $L_{-26,26}(3,2)$, and $L_{-26,26}(3,3)$;

Antenna 2: transmitted in the order of $L_{-26,26}(3,2)$, $L_{-26,26}(3,3)$, and $L_{-26,26}(3,1)$;

Antenna 3: transmitted in the order of $L_{-26,26}(3,3)$, $L_{-26,26}(3,1)$, and $L_{-26,26}(3,2)$;

TABLE 3

Long preamble structure pattern 1 ($L_{-26,26}(2,1)$) when two transmitting antennas

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| $L_{-26,26}(2,1)$ | 1 | 0 | −1 | 0 | 1 | 0 | −1 | 0 | −1 | 0 | 1 | 0 | 1 |
| Carrier number | −13 | −12 | −11 | −10 | −9 | −8 | −7 | −6 | −5 | −4 | −3 | −2 | −1 |
| $L_{-26,26}(2,1)$ | 0 | 1 | 0 | −1 | 0 | 1 | 0 | 1 | 0 | 1 | 0 | 1 | 0 |
| Carrier number | +1 | +2 | +3 | +4 | +5 | +6 | +7 | +8 | +9 | +10 | +11 | +12 | +13 |
| $L_{-26,26}(2,1)$ | 0 | −1 | 0 | 1 | 0 | −1 | 0 | −1 | 0 | −1 | 0 | −1 | 0 |
| Carrier number | +14 | +15 | +16 | +17 | +18 | +19 | +20 | +21 | +22 | +23 | +24 | +25 | +26 |
| $L_{-26,26}(2,1)$ | −1 | 0 | 1 | 0 | −1 | 0 | −1 | 0 | −1 | 0 | 1 | 0 | 1 |

(Pattern is 0 for carrier number 0.)

TABLE 4

Long preamble structure pattern 2 ($L_{-26,26}(2,2)$) when two transmitting antennas

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| $L_{-26,26}(2,2)$ | 0 | 1 | 0 | −1 | 0 | 1 | 0 | 1 | 0 | 1 | 0 | 1 | 0 |
| Carrier number | −13 | −12 | −11 | −10 | −9 | −8 | −7 | −6 | −5 | −4 | −3 | −2 | −1 |
| $L_{-26,26}(2,2)$ | 1 | 0 | −1 | 0 | 1 | 0 | −1 | 0 | −1 | 0 | 1 | 0 | 1 |
| Carrier number | +1 | +2 | +3 | +4 | +5 | +6 | +7 | +8 | +9 | +10 | +11 | +12 | +13 |
| $L_{-26,26}(2,2)$ | 1 | 0 | −1 | 0 | 1 | 0 | 1 | 0 | 1 | 0 | −1 | 0 | −1 |
| Carrier number | +14 | +15 | +16 | +17 | +18 | +19 | +20 | +21 | +22 | +23 | +24 | +25 | +26 |
| $L_{-26,26}(2,2)$ | 0 | 1 | 0 | −1 | 0 | 1 | 0 | 1 | 0 | 1 | 0 | 1 | 0 |

(Pattern is 0 for carrier number 0.)

Note that the long preambles may also be transmitted in the reverse orders as follows.

TABLE 5

Long preamble structure pattern 1 ($L_{-26,26}(3,1)$) when three transmitting antennas

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| $L_{-26,26}(3,1)$ | 1 | 0 | 0 | −1 | 0 | 0 | −1 | 0 | 0 | 1 | 0 | 0 | 1 |
| Carrier number | −13 | −12 | −11 | −10 | −9 | −8 | −7 | −6 | −5 | −4 | −3 | −2 | −1 |
| $L_{-26,26}(3,1)$ | 0 | 0 | −1 | 0 | 0 | 1 | 0 | 0 | −1 | 0 | 0 | 1 | 0 |
| Carrier number | +1 | +2 | +3 | +4 | +5 | +6 | +7 | +8 | +9 | +10 | +11 | +12 | +13 |
| $L_{-26,26}(3,1)$ | 0 | −1 | 0 | 0 | 1 | 0 | 0 | −1 | 0 | 0 | −1 | 0 | 0 |
| Carrier number | +14 | +15 | +16 | +17 | +18 | +19 | +20 | +21 | +22 | +23 | +24 | +25 | +26 |
| $L_{-26,26}(3,1)$ | −1 | 0 | 0 | −1 | 0 | 0 | −1 | 0 | 0 | 1 | 0 | 0 | 1 |

(Pattern is 0 for carrier number 0.)

TABLE 6

Long preamble structure pattern 2 ($L_{-26, 26}(3, 2)$) when three transmitting antennas)

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| $L_{-26, 26}(3, 2)$ | 0 | 1 | 0 | 0 | 1 | 0 | 0 | 1 | 0 | 0 | 1 | 0 | 0 |
| Carrier number | −13 | −12 | −11 | −10 | −9 | −8 | −7 | −6 | −5 | −4 | −3 | −2 | −1 |
| $L_{-26, 26}(3, 2)$ | 1 | 0 | 0 | −1 | 0 | 0 | −1 | 0 | 0 | 1 | 0 | 0 | 1 |
| Carrier number | +1 | +2 | +3 | +4 | +5 | +6 | +7 | +8 | +9 | +10 | +11 | +12 | +13 |
| $L_{-26, 26}(3, 2)$ | 1 | 0 | 0 | 1 | 0 | 0 | 1 | 0 | 0 | −1 | 0 | 0 | −1 |
| Carrier number | +14 | +15 | +16 | +17 | +18 | +19 | +20 | +21 | +22 | +23 | +24 | +25 | +26 |
| $L_{-26, 26}(3, 2)$ | 0 | 0 | 1 | 0 | 0 | 1 | 0 | 0 | −1 | 0 | 0 | 1 | 0 |

(Pattern is 0 for carrier number 0.)

TABLE 7

Long preamble structure pattern 3 ($L_{-26, 26}(3, 3)$) when three transmitting antennas

| Carrier number | −26 | −25 | −24 | −23 | −22 | −21 | −20 | −19 | −18 | −17 | −16 | −15 | −14 |
|---|---|---|---|---|---|---|---|---|---|---|---|---|---|
| $L_{-26, 26}(3, 3)$ | 0 | 0 | −1 | 0 | 0 | 1 | 0 | 0 | −1 | 0 | 0 | 1 | 0 |
| Carrier number | −13 | −12 | −11 | −10 | −9 | −8 | −7 | −6 | −5 | −4 | −3 | −2 | −1 |
| $L_{-26, 26}(3, 3)$ | 0 | 1 | 0 | 0 | 1 | 0 | 0 | 1 | 0 | 0 | 1 | 0 | 0 |
| Carrier number | +1 | +2 | +3 | +4 | +5 | +6 | +7 | +8 | +9 | +10 | +11 | +12 | +13 |
| $L_{-26, 26}(3, 3)$ | 0 | 0 | −1 | 0 | 0 | −1 | 0 | 0 | 1 | 0 | 0 | −1 | 0 |
| Carrier number | +14 | +15 | +16 | +17 | +18 | +19 | +20 | +21 | +22 | +23 | +24 | +25 | +26 |
| $L_{-26, 26}(3, 3)$ | 0 | 1 | 0 | 0 | −1 | 0 | 0 | 1 | 0 | 0 | 1 | 0 | 0 |

(Pattern is 0 for carrier number 0.)

As when there are two antennas, the orders of known symbols to be transmitted can be switched, provided that the combination of antenna directions remains the same.

In the same manner as above, when there are M antennas, subcarriers are allocated to every Mth position from the −26th position for the −26th to −1st subcarriers, and are similarly allocated to every Mth position for the 1st to 26th subcarriers.

In the second embodiment as described above, even in a MIMO wireless LAN system, channel estimation values can be obtained from known symbols in the same manner as in the first embodiment.

Third Embodiment

Figure 4A:
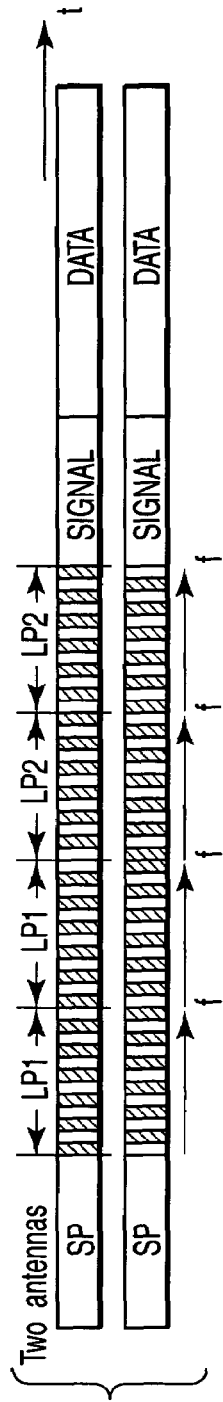
FIGS. 4A and 4B are views for explaining a known symbol transmission method according to a third embodiment.
Figure 4B:
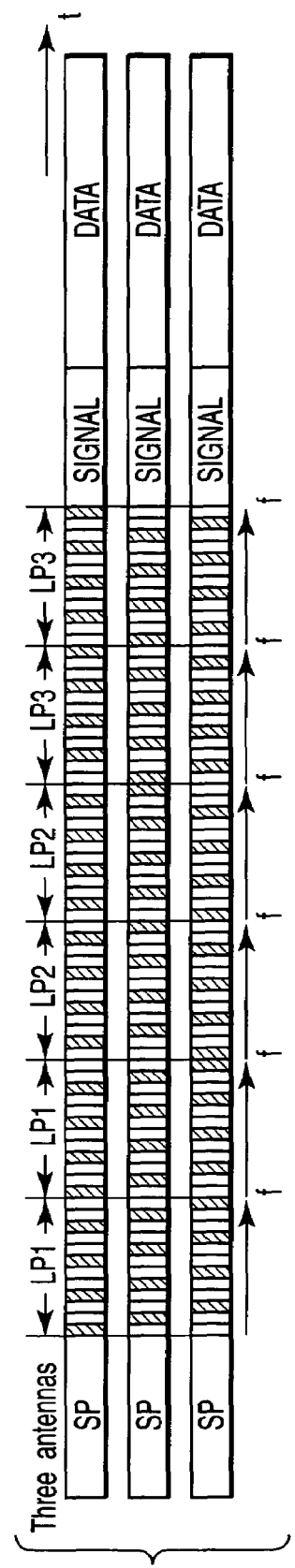
Figure 5:
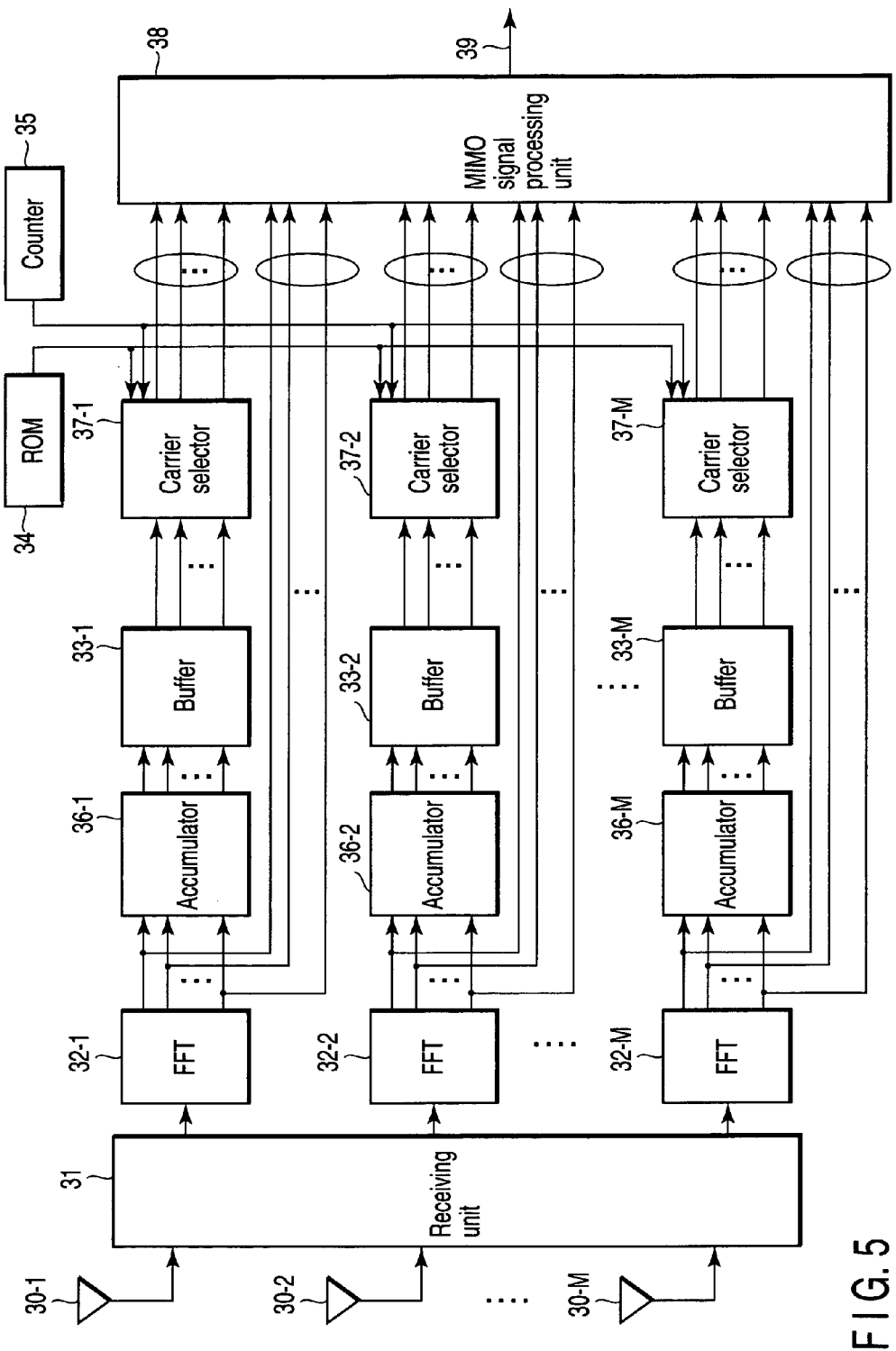
FIG. 5 is a block diagram of a receiver according to the third embodiment.

A method of transmitting known symbols for channel estimation according to a third embodiment of the present invention will be described below with reference to FIGS. 4A and 4B. FIGS. 4A and 4B show the structures of radio frames containing preambles when the numbers of antennas which simultaneously transmit known symbols are two and three, respectively.

In the first embodiment, channel estimation can be performed by receiving M known symbols for the number M of transmitting antennas. In contrast, the third embodiment assumes the reception of 2M known symbols in order to raise the accuracy of channel estimation in FIG. 3. When the known symbol pattern LP(M,n) (M is the number of transmitting antennas, and n is the pattern number) explained in the first embodiment is used, known symbols are transmitted as follows in the third embodiment.

<Two Transmitting Antennas>

Antenna 1: transmitted in the order of LP(2,1), LP(2,1), LP(2,2), and LP(2,2);

Antenna 2: transmitted in the order of LP(2,2), LP(2,2), LP(2,1), and LP(2,1);

<Three Transmitting Antennas>

Antenna 1: transmitted in the order of LP(3,1), LP(3,1), LP(3,2), LP(3,2), LP(3,3), and LP(3,3);

Antenna 2: transmitted in the order of LP(3,2), LP(3,2), LP(3,3), LP(3,3), LP(3,1), and LP(3,1);

Antenna 3: transmitted in the order of LP(3,3), LP(3,3), LP(3,1), LP(3,1), LP(3,2), and LP(3,2);

Even when there are four or more transmitting antennas, known symbols having the same pattern are continuously transmitted as described above. On the other hand, the receiving side can reduce the influence of noise by cumulatively adding known symbols having the same pattern, and can raise the accuracy of channel estimation.

In the third embodiment as described above, the efficiency lowers because the number of known symbols increases. However, the accuracy of channel estimation can be raised as in the known symbol transmission method explained in the first embodiment.

Fourth Embodiment

In a MIMO wireless communication system, it is generally necessary to estimate the number of transmitting antennas on the receiving side. If this estimation of the number of transmitting antennas fails, the subsequent data portion cannot be demodulated any longer. Therefore, the estimation requires very high accuracy. In a fourth embodiment of the present invention, a method in which the transmitting side does not notify the number of transmitting antennas and the receiving side performs blind estimation of the number of antennas will be explained.

Figure 6:
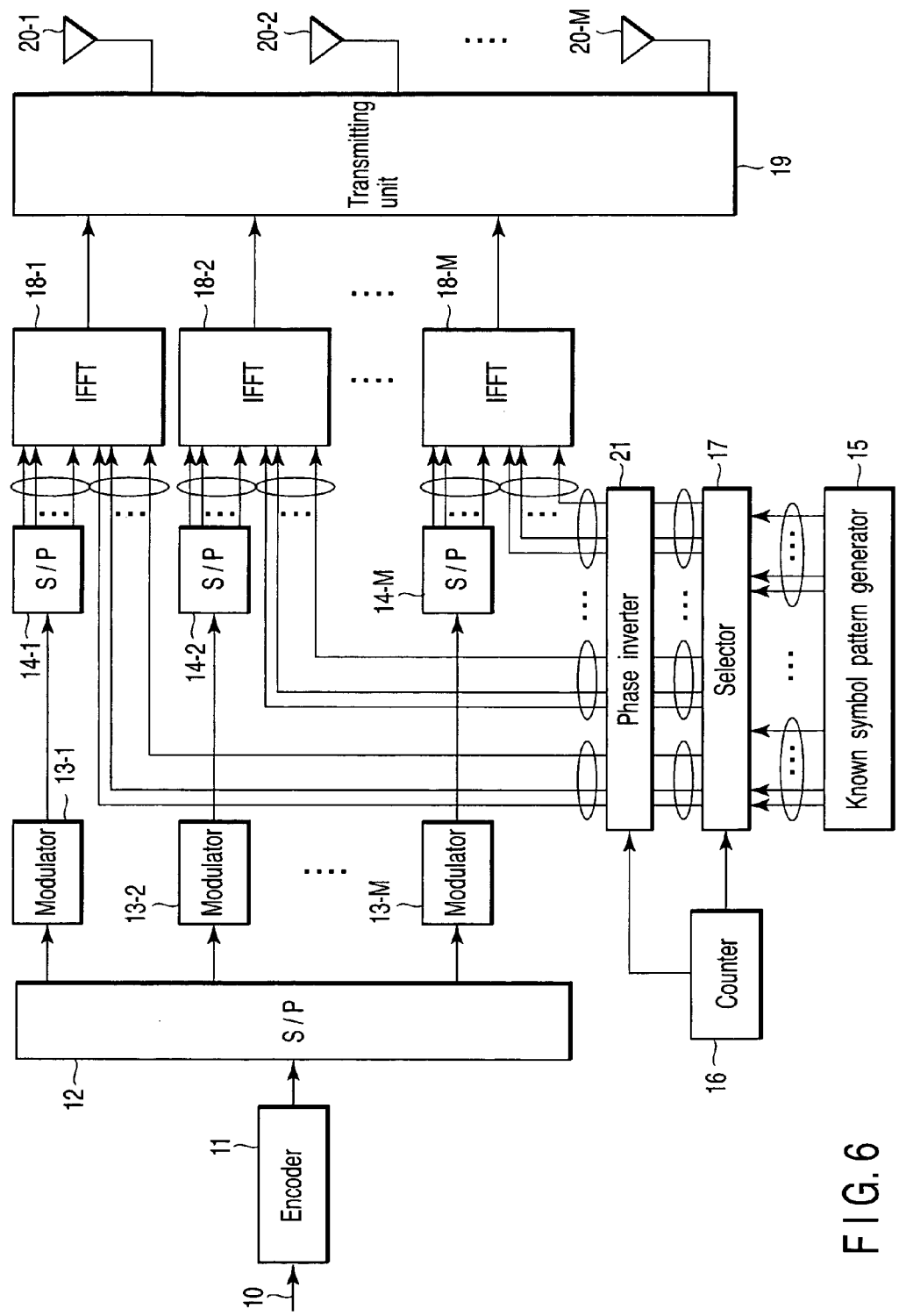
FIG. 6 is a block diagram of a transmitter according to a fourth embodiment of the present invention.

As shown in FIG. 6, a transmitter according to the fourth embodiment of the present invention has a phase inverter 21 in addition to the transmitter of the other embodiments shown in FIG. 1. A method of transmitting known symbols for channel estimation will be explained below with reference to FIGS. 7A, 7B, and 7C. FIGS. 7A, 7B, and 7C illustrate the structures of radio packets containing preambles when the numbers of antennas which simultaneously transmit known symbols are two, three, and four, respectively. Although FIGS. 7A, 7B, and 7C are similar to FIGS. 2A, 2B, and 2C, of known symbols transmitted from each antenna, the phase of the last symbol is inverted. That is, the phase of each blackened subcarrier in FIGS. 7A, 7B, and 7C is inverted from that of a subcarrier to be originally transmitted. The phase inverter 21 shown in FIG. 6 performs this phase inversion.

When the known symbol pattern LP(M,n) (M is the number of transmitting antennas, and n is the pattern number) explained in the first embodiment is used, known symbols are transmitted as follows in the fourth embodiment.

Figure 8A:
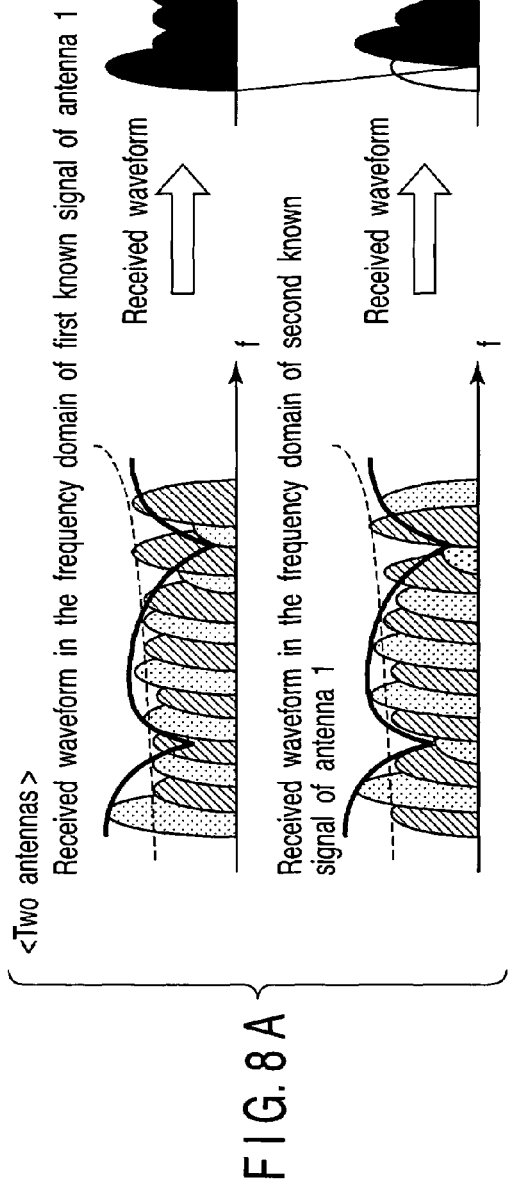
FIGS. 8A and 8B are views each showing the relationship between the known symbol subcarrier arrangement and the channel response for explaining the fourth embodiment.
Figure 8B:
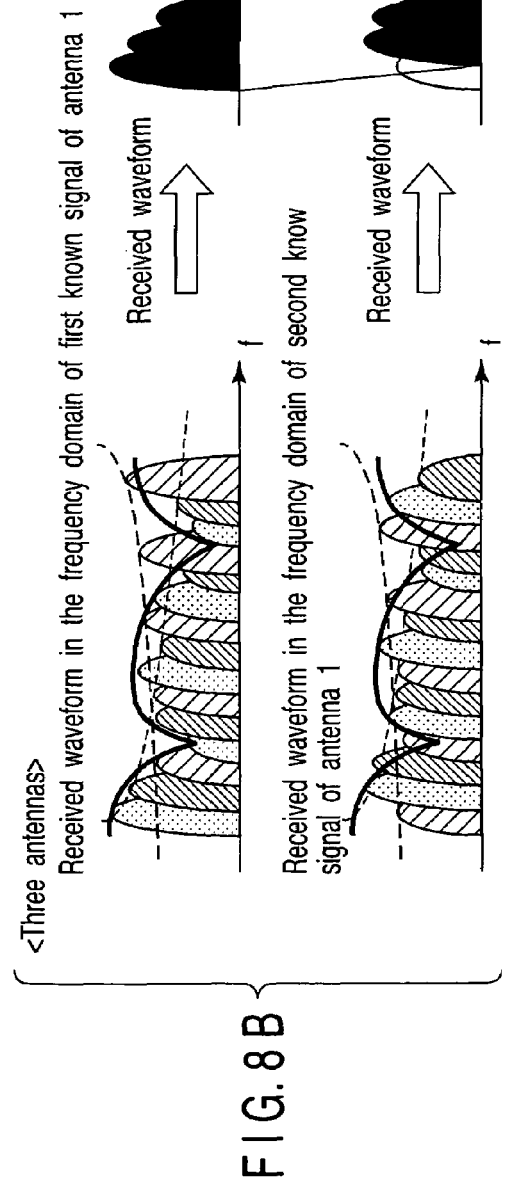

<Two Transmitting Antennas>
Antenna 1: transmitted in the order of LP(2,1) and −LP(2, 2);
Antenna 2: transmitted in the order of LP(2,2) and −LP(2, 1);

<Three Transmitting Antennas>
Antenna 1: transmitted in the order of LP(3,1), LP(3,2), and −LP(3,3);
Antenna 2: transmitted in the order of LP(3,2), LP(3,3), and −LP(3,1);
Antenna 3: transmitted in the order of LP(3,3), LP(3,1), and −LP(3,2);

<Four Transmitting Antennas>
Antenna 1: transmitted in the order of LP(4,1), LP(4,2), LP(4,3), and −LP(4,4);
Antenna 2: transmitted in the order of LP(4,2), LP(4,3), LP(4,4), and −LP(4,1);
Antenna 3: transmitted in the order of LP(4,3), LP(4,4), LP(4,1), and −LP(4,2);
Antenna 4: transmitted in the order of LP(4,4), LP(4,1), LP(4,2), and −LP(4,3);

Where, −LP(M,n) denotes that all components of LP(M,n) are multiplied by −1. It means that long preamble that −LP(M,n) is applied are phase inverted. If the fluctuations of the channels are small, the channels of symbols temporary adjacent to each other are presumably substantially the same. Also, the effects of the channels of adjacent subcarriers are presumably substantially the same. Therefore, as shown in FIGS. 8A and 8B, the waveforms in the frequency domain of temporary adjacent symbols are probably highly correlated.

When temporary adjacent known symbols of each antenna are correlated in the above case, the following is expected on all the receiving antennas.

<Two Transmitting Antennas>

The waveforms in the frequency domain of the first and second received known symbols are highly correlated, and the correlation value is negative because the phase of the second known symbol is inverted.

<Three Transmitting Antennas>

The waveforms in the frequency domain of the first and second received known symbols are highly correlated, and the correlation value is positive.

The waveforms in the frequency domain of the second and third received known symbols are highly correlated, and the correlation value is negative because the phase of the third known symbol is inverted.

Four Transmitting Antennas

The waveforms in the frequency domain of the first and second received known symbols are highly correlated, and the correlation value is positive.

The waveforms in the frequency domain of the second and third received known symbols are highly correlated, and the correlation value is positive.

The waveforms in the frequency domain of the third and fourth received known symbols are highly correlated, and the correlation value is negative because the phase of the fourth known symbol is inverted.

As is apparent from the foregoing, when there are two transmitting antennas, the correlation between the first two adjacent symbols has a negative value, so it can be estimated at this point that there are two antennas. If the correlation has a positive value, the correlation between the next two adjacent symbols is checked. The number of transmitting antennas can be estimated by the number of known symbols received when the correlation value changes to negative.

Figure 9:
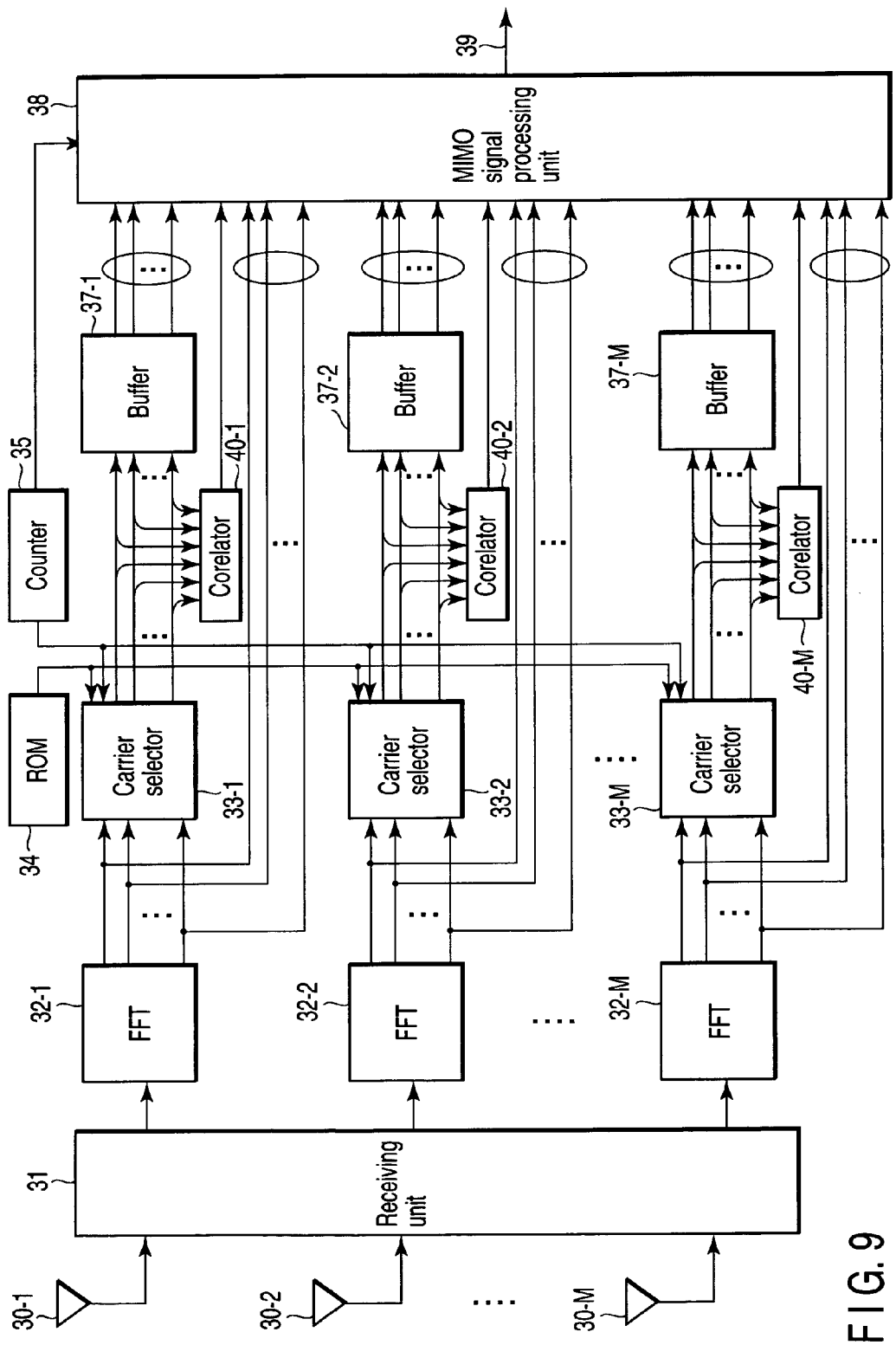
FIG. 9 is a block diagram of a receiver according to the fourth embodiment.

FIG. 9 shows a receiver having this number-of-antenna estimating function. This receiver has correlators 40-1 to 40-M for obtaining the correlation described above in addition to the receiver shown in FIG. 3.

Figure 10:
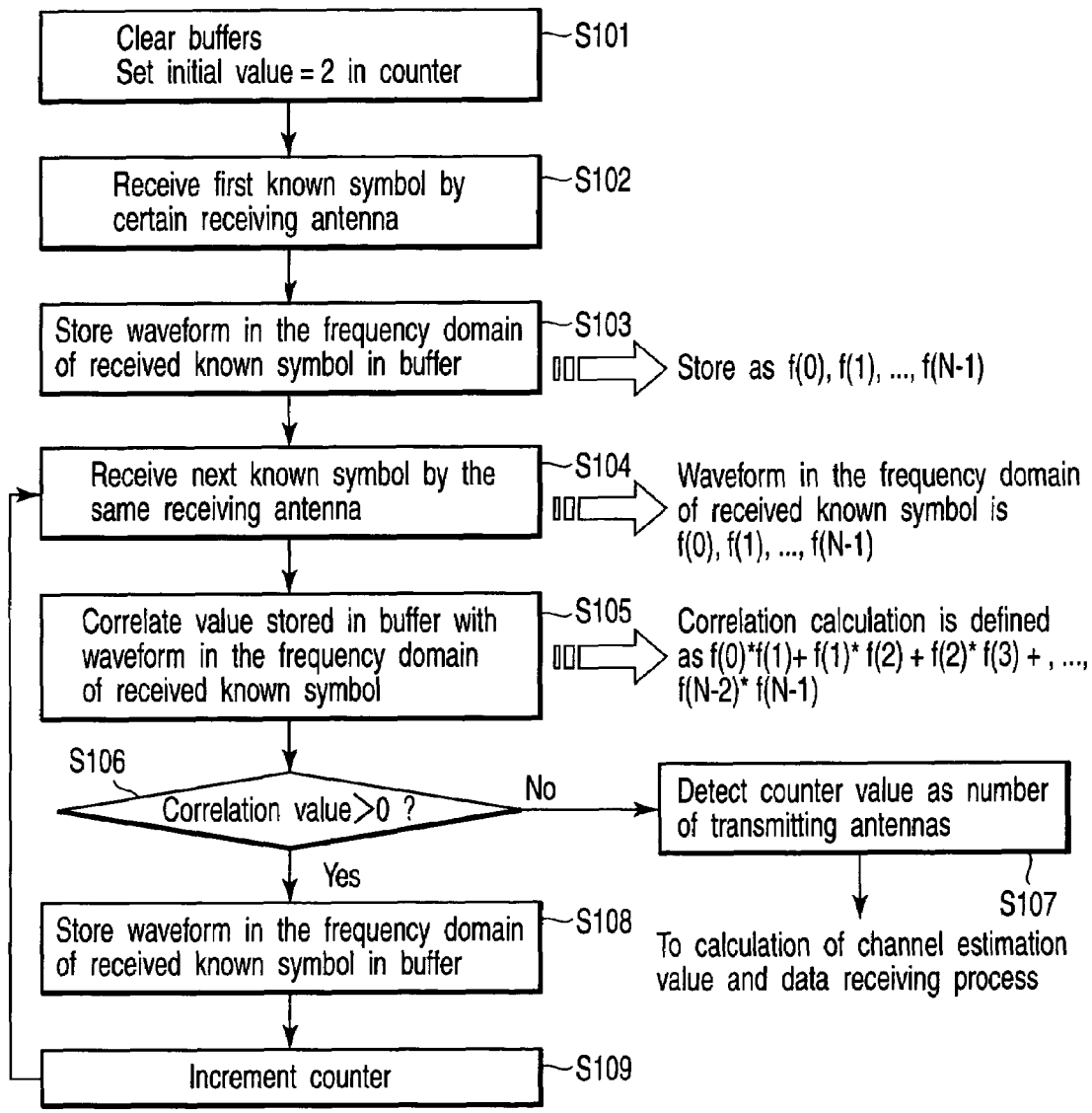
FIG. 10 is a flowchart showing a transmitting antenna count estimating algorithm in the receiver shown in FIG. 6.

The algorithm of a transmitting antenna count estimating sequence in the receiver shown in FIG. 9 will be described below with reference to FIG. 10. First, buffers 37-1 to 37-M are cleared, and 2 is set as an initial value in a counter 35. After that, a known symbol received by a certain antenna (30-i) is buffered in a buffer 37-i (steps S101 to S103). Then, a correlator 40-i obtains the correlation between the waveform in the frequency domain of the buffered known symbol and that of a known symbol received by the same antenna (steps S104 and S105). As explained in the first embodiment, adjacent known symbols are shifted from each other by one subcarrier. Therefore, this correlation calculation is defined as follows.

Assuming that the waveform in the frequency domain of the buffered data (i.e., the immediately preceding known symbol) is f(0), f(1), f(2), . . . , f(N−1) (N is the number of subcarriers), and that the waveform in the frequency domain of the known symbol received next is f'(0), f'(1), f'(2), . . . , f'(N−1), (Correlation value)=$f(0)*f'(1)+f(1)*f'(2)+f(2)*f'(3)+ \ldots +f(N-2)*f'(N-1)$ where a*b is a calculation of multiplying a by the complex conjugate of b.

A MIMO signal processing unit 38 checks the correlation value thus calculated by the correlator 37-i (step S106). If the correlation value is negative, the MIMO signal processing unit 38 determines that the currently received symbol is the last known symbol, and estimates the number of transmitting antennas on the basis of the number of known symbol patterns received so far which is obtained by the counter 35 (step S107).

The MIMO signal processing unit 38 reproduces the data symbols by using the number of transmitting antennas thus estimated. If it is determined in step S106 that the correlation value is not negative, the MIMO signal processing unit 38 buffers the waveform in the frequency domain of the received known symbol (step S108), and increments the counter 35 (step S109). The MIMO signal processing unit 38 repeats the operations in steps S104 to S109 whenever a new known symbol is received.

If a plurality of receiving antennas are used, the following methods are also possible.

(a) Only when correlation values are negative for all the receiving antennas, it is determined that the end of a known symbol is detected, and the number of transmitting antennas is determined.

(b) Correlation values calculated from all the receiving antennas are added, and, if the total correlation value is negative, it is determined that the end of a known symbol is detected, and the number of transmitting antennas is determined.

Although the conditions of method (a) are severer, the number of transmitting antennas can be reliably detected if the conditions are met.

Fifth Embodiment

Figure 11A:
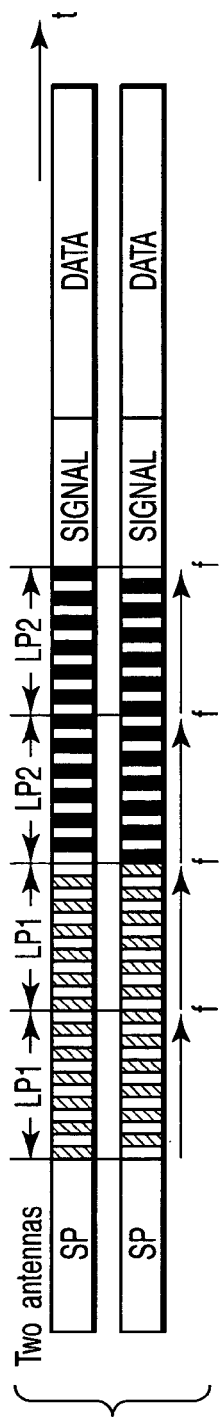
FIGS. 11A and 11B are views for explaining a known symbol transmission method according to a fifth embodiment of the present invention.
Figure 11B:
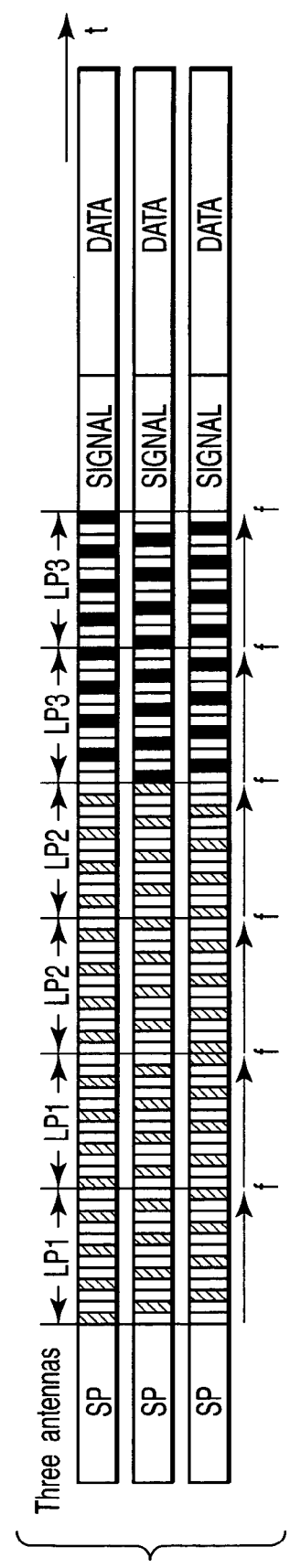

A method of transmitting known symbols for channel estimation according to a fifth embodiment of the present invention will be described below with reference to FIGS. 11A and 11B. FIGS. 11A and 11B illustrate the structures of radio packets containing preambles when the numbers of antennas which simultaneously transmit known symbols are two and three, respectively.

In the fifth embodiment, to raise the transmitting antenna count estimation accuracy and channel estimation accuracy, known symbols having the same pattern are repetitively transmitted as in the second embodiment.

In addition, to achieve blind estimation of the number of antennas as in the fourth embodiment, of known symbols transmitted from each antenna, the phase of the last symbol is inverted, i.e., the phase of each blackened subcarrier shown in FIGS. 11A and 11B is inverted from that of a subcarrier to be originally transmitted. This phase inverting operation is performed by a phase inverter 21 shown in FIG. 6. In the fifth embodiment, known symbols are transmitted as follows.

Two Transmitting Antennas
  Antenna 1: transmitted in the order of LP(2,1), LP(2,1), −LP(2,2), and −LP(2,2);
  Antenna 2: transmitted in the order of LP(2,2), LP(2,2), −LP(2,1), and −LP(2,1);

<Three Transmitting Antennas>
  Antenna 1: transmitted in the order of LP(3,1), LP(3,1), LP(3,2), LP(3,2), −LP(3,3), and −LP(3,3);
  Antenna 2: transmitted in the order of LP(3,2), LP(3,2), LP(3,3), LP(3,3), −LP(3,1), and −LP(3,1);
  Antenna 3: transmitted in the order of LP(3,3), LP(3,3), LP(3,1), LP(3,1), −LP(3,2), and −LP(3,2);

Even when there are four or more transmitting antennas, known symbols having the same pattern are similarly continuously transmitted.

This known symbol transmission according to the fifth embodiment can be realized by a transmitter having the arrangement shown in FIG. 6. However, the last known symbol is transmitted with its phase inverted. Therefore, if a counter 16 identifies a known symbol as the last one, the phase inverter 21 inverts the phase, and known symbols are allocated to antennas 20-1 to 20-M. The operation of a selector 17 is the same as in the third embodiment.

On the other hand, the receiving side can reduce the influence of noise by cumulatively adding known symbols having the same pattern as follows, and can raise the accuracy of estimation of the number of transmitting antennas and the accuracy of channel estimation as explained in the fourth embodiment.

As shown in FIG. 12, in order to perform the estimation as described above, the receiver according to the fifth embodiment additionally has two counters 35-1 (to be referred to as counter 1 hereinafter) and 35-2 (to be referred to as counter 2 hereinafter), cumulative adders 36-1 to 36-M, buffers 37-11 to 37-M1 (to be referred to as buffer 1 hereinafter), buffers 37-12 to 37-M2 (to be referred to as buffer 2 hereinafter), selectors 41-1 to 41-M, and correlators 42-1 to 42-M, when compared to the receiver shown in FIG. 3.

OFDM signals of an RF band transmitted from a transmitter (not shown) are received by receiving antennas 30-1 to 30-M, and input to a receiving unit 31. The output signals from the receiving unit 31 are input to FFT units 32-1 to 32-M where the time domain signals are converted into frequency domain signals, i.e., subcarriers. Of the output signals from the FFT units 32-1 to 32-M, signals of data symbol sections are input to a MIMO signal processing unit 38.

On the other hand, of the output signals from the FFT units 32-1 to 32-M, values having the same known symbol pattern of signals of preambles, particularly, known symbol sections are cumulatively added by the cumulative adders 36-1 to 36-M. The cumulative addition result is stored in buffer 1. Subsequently, values having the same known symbol pattern of the values of waveforms in the frequency domain selected by the carrier selectors 33-1 to 33-M for subcarriers of known symbols received next are cumulatively added by the cumulative adders 36-1 to 36-M. The cumulative addition result is stored in buffer 2.

These cumulative addition results are input to carrier selectors 33-1 to 33-M, and the transmitting antennas and subcarriers are related to each other in accordance with known symbol patterns stored in a ROM 34. In this manner, the cumulative addition results are used as channel estimation values between the transmitting antennas and receiving antennas in demodulation by the MIMO signal processing unit 38.

As described above, the cumulative addition results of different known symbol patterns are stored in buffers 1 and 2. The correlators 42-1 to 42-M correlate the cumulative addition results stored in buffers 1 and 2 to estimate the number of antennas. Counter 2 controls the timing of this correlation calculation. The number of transmitting antennas is estimated on the basis of the count of counter 2 and the result of the correlation calculation.

After the number of transmitting antennas is estimated, the values stored in buffers 1 and 2 are used as channel estimation values in the MIMO signal processing unit 38. The MIMO signal processing unit 38 performs a MIMO signal receiving process, e.g., maximum likelihood estimation, on the data symbol section signals from the FFT units 32-1 to 32-M in accordance with the channel estimation values from buffers 1 and 2. Channel decoding is performed on the signals having undergone this MIMO signal receiving process, thereby reproducing transmitted data 39.

Figure 13B:
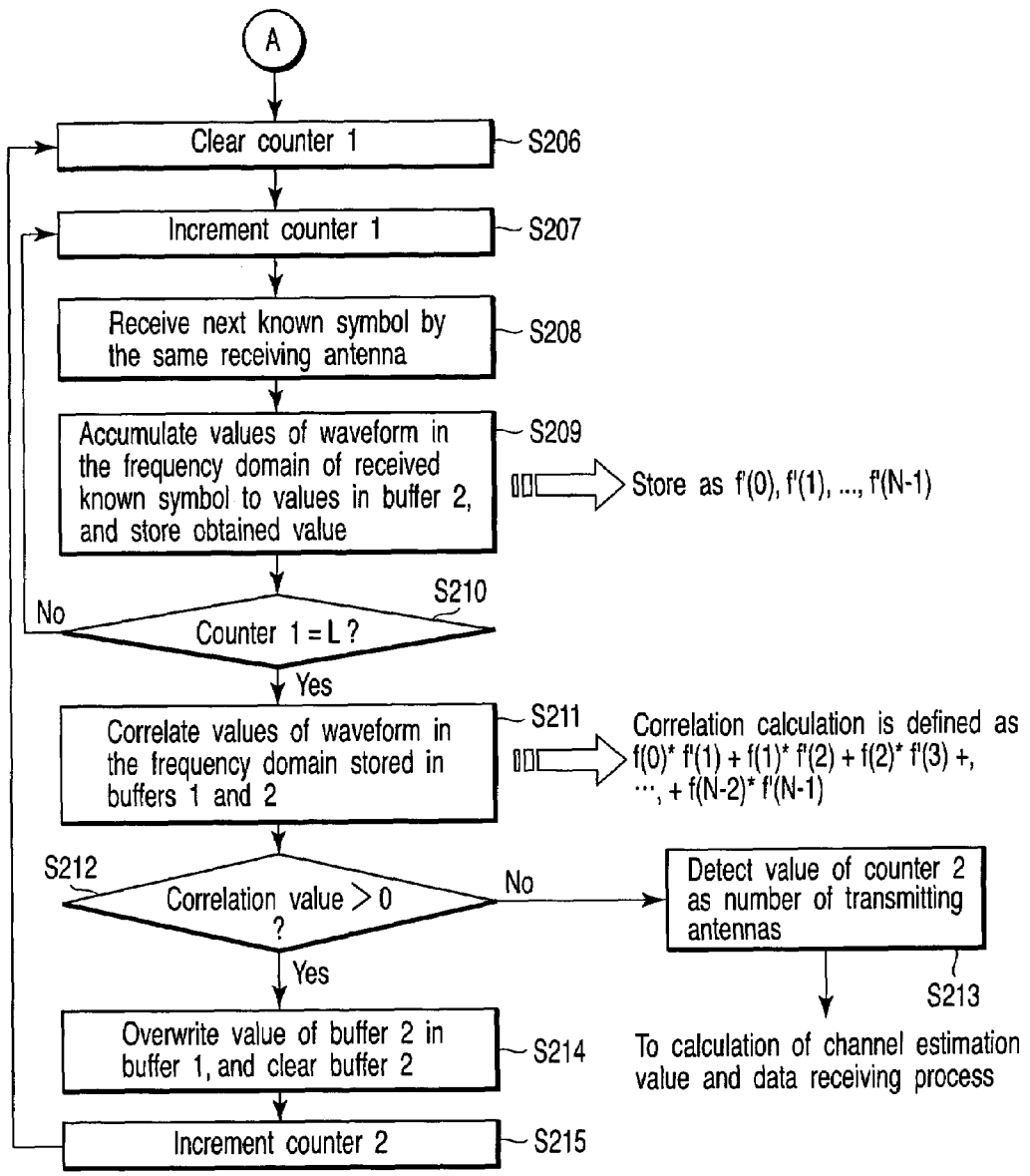

FIG. 13 shows the algorithm of a transmitting antenna count estimating sequence in the receiver shown in FIG. 12. This algorithm is basically the same as FIG. 10 except that the accuracy of estimation of the number of transmitting antennas can be raised by cumulatively adding and buffering known symbols having the same pattern. In particular, it is assumed in FIGS. 11A and 11B that L known symbols having the same pattern are repetitively transmitted. Note that FIG. 10 shows an example of a case in which L=2.

The sequence shown in FIG. 13 will be explained below. First, buffers 1 and 2 are cleared, and 0 and 2 are set as initial values in counters 1 and 2, respectively. After that, the waveform in the frequency domain of a known symbol received for the first time by a certain antenna is cumulatively added to a value stored in buffer 1 and thereby buffered in buffer 1 (steps S201 to S204). The processes in steps S202 to S204 are repeated until it is determined in step S205 that counter 1 is L.

Then, counter 1 is cleared and incremented, and the known symbol buffered in buffer 1 and the waveform in the frequency domain of the next known symbol received by the same antenna are cumulatively added to a value stored in buffer 2 and thereby buffered in buffer 2 (steps S206 to S209). The processes in steps S207 to S209 are repeated until it is determined in step S210 that counter 1 is L.

The waveforms in the frequency domain of the values stored in buffers 1 and 2 are correlated, and the correlation value is checked (steps S211 and S212). If this correlation value is negative, it is estimated that the counter value is the number of transmitting antennas (step S213).

The MIMO signal processing unit 38 reproduces the data symbols by using the number of transmitting antennas thus estimated. If it is determined in step S213 that the correlation value is not negative, the value buffered in buffer 2 is overwritten in buffer 1, buffer 2 is cleared, and counter 2 is incremented (steps S214 and S215). After that, the flow returns to step S206.

As in the fourth embodiment, if a plurality of receiving antennas are used, the following methods are also possible.

(a) Only when correlation values are negative for all the receiving antennas, it is determined that the end of a known symbol is detected, and the number of transmitting antennas is determined.

(b) Correlation values calculated from all the receiving antennas are added, and, if the total correlation value is negative, it is determined that the end of a known symbol is detected, and the number of transmitting antennas is determined.

Although the conditions of method (a) are severer, the number of transmitting antennas can be reliably detected if the conditions are met.

Sixth Embodiment

A method of transmitting known symbols for channel estimation according to the sixth embodiment of the present invention will be described below with reference to FIGS. 14A, 14B, and 14C. FIGS. 14A, 14B, and 14C illustrate the structures of radio packets containing preambles when the numbers of antennas which simultaneously transmit known symbols are one, two, and three, respectively. In the sixth embodiment as shown in FIGS. 14A to 14C, two known symbols are transmitted from a single antenna, unlike in the fifth embodiment. Since the number of symbols is two, the second known symbol has the same subcarrier arrangement as that of the first known symbol but has a phase inverted from that of the first known symbol.

When two or more antennas, the known symbol arrangement is based on the fifth embodiment. In this case, the receiving side can detect whether the number of antennas is one by correlating the first and second known symbols. More specifically, assume that the waveform in the frequency domain of the first known symbol is $f_1(0), f_1(1), f_1(2), \ldots f_1(N-1)$;

the waveform in the frequency domain of the second known symbol is $f_2(0), f_2(1), f_2(2), \ldots, f_2(N-1)$;

In this case, the correlation value is defined by correlation value: $f_1(0)*f_2(0)+f_1(1)*f_2(1)+f_1(2)*f_2(2)+\ldots+f_1(N-1)*f_2(N-1)$ If this correlation value is positive, the number of antennas is two or more. If the value is negative, the number of antennas is one.

When the known symbol transmission method as in the sixth embodiment is used, it is possible, in the flowchart shown in FIG. 13, to check whether the number of transmitting antennas is one when the first known symbol is received, and estimate the number of antennas by using the correlation with the subsequent known symbol.

Figure 15A:
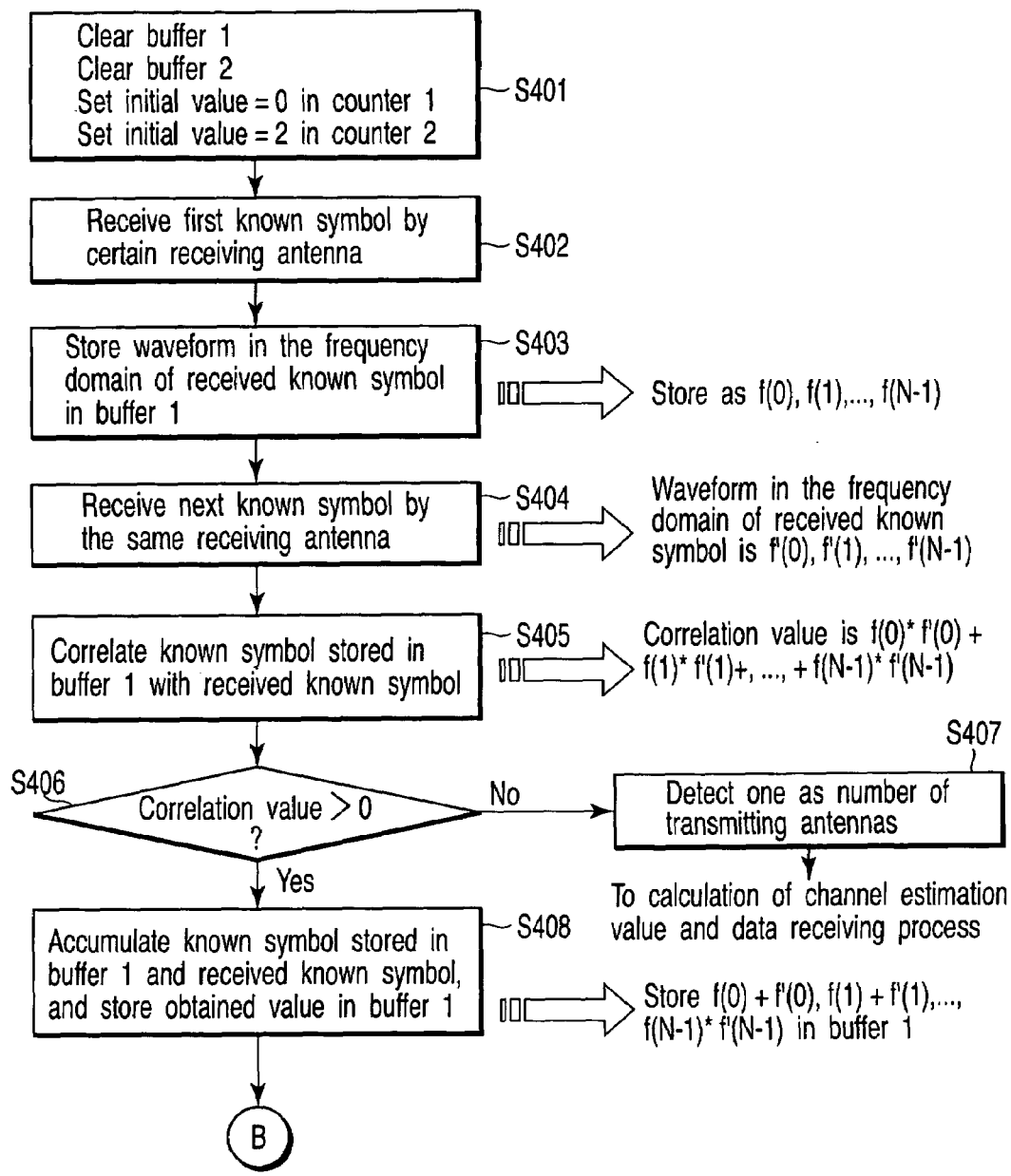
FIGS. 15A and 15B are flowcharts showing a transmitting antenna count estimating algorithm in the sixth embodiment.
Figure 15B:
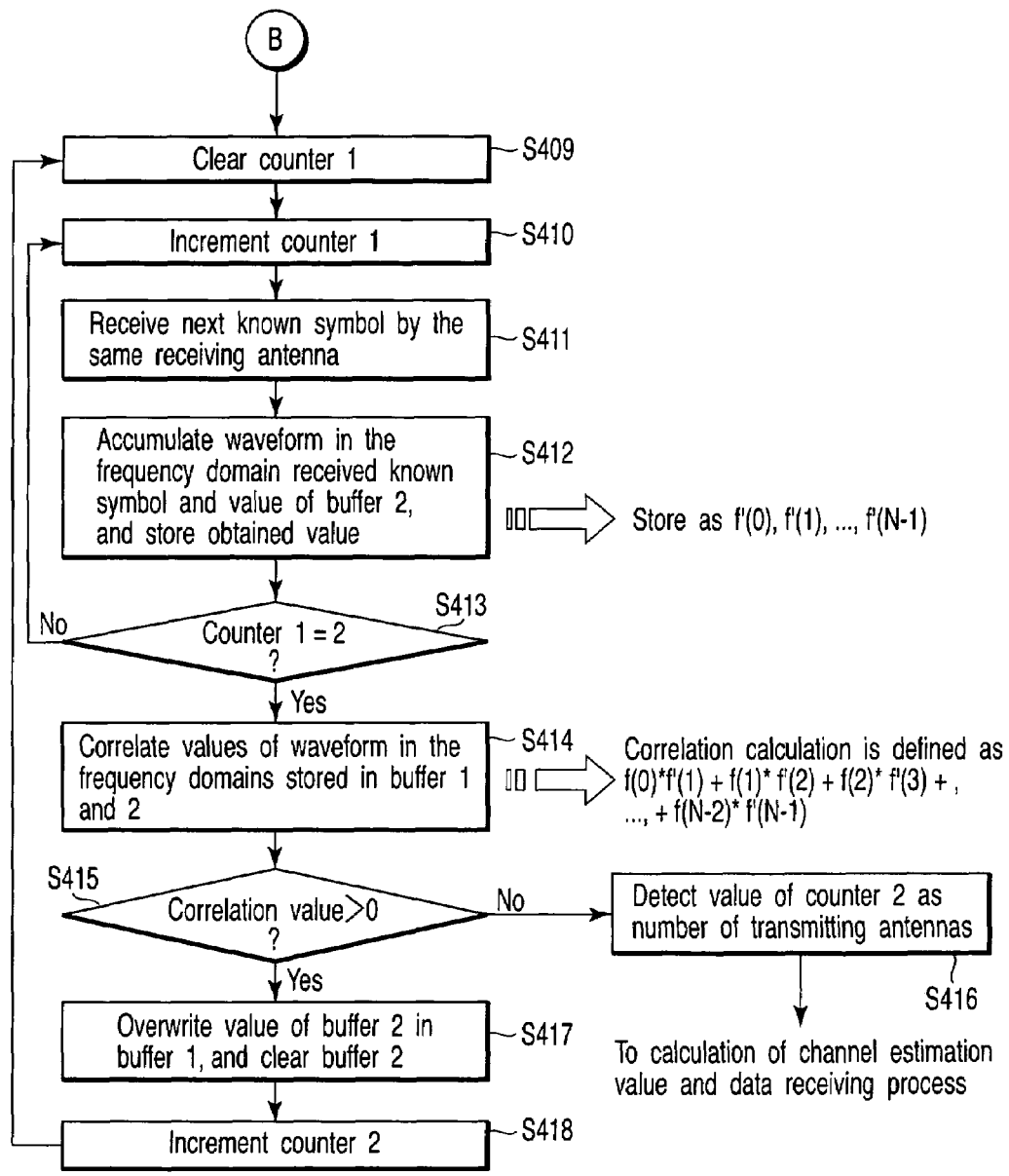

FIG. 15 shows a process flow of the receiver according to the sixth embodiment. FIG. 15 differs from the flowchart shown in FIG. 13 in that whether the number of transmitting antennas is one is checked when the first known symbol is received, and then the number of antennas is estimated by using the correlation with the subsequent known symbol.

The sequence of FIG. 15 will be explained below. First, buffers 1 and 2 are cleared, and 0 and 2 are set as initial values in counters 1 and 2, respectively. After that, the waveform in the frequency domain of a known symbol received for the first time by a certain antenna is stored in buffer 1. The waveform in the frequency domain of the known symbol stored in buffer 1 and the waveform in the frequency domain of the next known symbol received by the same antenna are correlated, and the correlation value is checked (steps S401 to S406). If this correlation value is negative, it is estimated that the number of transmitting antennas is one (step S407).

If it is determined in step S406 that the correlation value is not negative, the waveform in the frequency domain of the known symbol stored in buffer 1 and the waveform in the frequency domain of the received known symbol are cumulatively added and stored in buffer 1, and counter 2 is cleared and then incremented (steps S408 to S410). Then, the same antenna is used to receive the next known symbol (step S411), the waveform in the frequency domain of the received known symbol is cumulatively added to the value stored in buffer 2 and thereby stored in buffer 2 (step S412).

The processes in steps S410 to S412 are repeated until it is determined in step S413 that counter 1 is 2.

Then, the waveforms in the frequency domain of the values stored in buffers 1 and 2 are correlated, and the correlation value is checked (steps S414 and S415). If this correlation value is negative, it is estimated that the value of counter 2 is the number of transmitting antennas (step S416).

If it is determined in step S415 that the correlation value is not negative, the value stored in buffer 2 is overwritten in buffer 1, buffer 2 is cleared, and counter 2 is incremented (steps S417 and S418). After that, the flow returns to step S409.

In the sixth embodiment as described above, even when the number of transmitting antennas can be one, the number of antennas can be estimated with high accuracy.

Seventh Embodiment

A method of transmitting known symbols for channel estimation according to the seventh embodiment of the present invention will be described below with reference to FIGS. 16A, 16B, and 16C. FIGS. 16A, 16B, and 16C illustrate the structures of radio packets containing preambles when the numbers of antennas which simultaneously transmit known symbols are one, two, and three, respectively. In the seventh embodiment, normal known symbols having no phase inversion are transmitted when the number of transmitting antennas is one. In this case, whether the number of antennas is one is checked by correlating the waveform of an even-numbered subcarrier with that of an odd-numbered subcarrier. If the number of antennas is one, the correlation between adjacent subcarriers is presumably high. If the number of antennas is two or more, adjacent subcarriers are known symbols from different antennas, so the correlation between them is low.

The above algorithm will be described in detail below.

Assume that the waveform in the frequency domain of the first known symbol is $f_1(0), f_1(1), f_1(2), \ldots, f_1(N-1)$;

the waveform in the frequency domain of the second known symbol is $f_2(0), f_2(1), f_2(2), \ldots, f_2(N-1)$;

In this case, the correlation value is defined by correlation value: $f_1(0)*f_2(1)+f_1(2)*f_2(3)+f_1(4)*f_2(5)+\ldots+f_1(N-2)*f_2(N-1)$ It can be estimated that the number of antennas is one if this correlation value is exceeded, and that the number of antennas is two or more if not. If it is determined that the number of antennas is two or more, the number of antennas can be estimated by the algorithm explained in the fifth embodiment.

Another algorithm is as follows. Assuming that the waveform in the frequency domain of the result of cumulative addition of the first and second known symbols is $f_x(0), f_x(1), f_x(2), \ldots, f_x(N-1)$, the correlation value is defined by correlation value: $f_x(0)*f_x(1)+f_x(2)*f_x(3)+f_x(4)*f_x(5)+\ldots+f_x(N-2)*f_x(N-1)$ If can be determined that the number of antennas is one if this correlation value is exceeded, and that the number of antennas is two or more if not.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus comprising:

a plurality of antennas;

a known symbol transmitting unit configured to transmit a plurality of known symbol sequences by using said plurality of antennas, each of the known symbol sequences containing a plurality of known symbols, and a plurality of known symbols transmitted from different antennas and having different subcarrier arrangements; and a data symbol transmitting unit configured to transmit a data symbol by using said plurality of antennas, after the known symbol sequences are transmitted, wherein in the different subcarrier arrangements, positions of subcarriers on which information of the known symbols is carried form a nested structure.

2. An apparatus according to claim 1, wherein the known symbol transmitting unit comprises a memory which stores a plurality of known symbol patterns having different subcarrier arrangements, a timing generator which generates a timing signal indicating a timing at which the known symbol is to be transmitted, and a selector which selects a pattern to be used as the known symbol from said plurality of known symbol patterns in accordance with the timing signal.

3. An apparatus according to claim 2, wherein the known symbol transmitting unit comprises a phase inverter which inverts a phase of a pattern selected by the selector.

4. An apparatus according to claim 1, wherein the known symbol transmitting unit includes a phase inverter to invert a phase of a known symbol to be transmitted last of the known symbol sequences.

5. An apparatus according to claim 1, wherein the known symbol transmitting unit is configured to transmit repetitively said plurality of known symbol sequences.

6. An apparatus according to claim 5, wherein the known symbol transmitting unit includes a phase inverter to invert a phase of a last known symbol sequence of the known symbol sequences to be repetitively transmitted the plurality of times.

7. An apparatus according to claim 1, further comprising a second known symbol transmitting unit which transmits, by using one antenna selected from said plurality of antennas, a second known symbol sequence containing a plurality of known symbols having same subcarrier arrangement and opposite phases.

* * * * *